United States Patent
Oshino

(10) Patent No.: US 12,444,023 B2
(45) Date of Patent: Oct. 14, 2025

(54) PROGRAM, METHOD, INFORMATION PROCESSING APPARATUS, AND SYSTEM FOR GENERATING A COMBINATION IMAGE

(71) Applicant: The Pokémon Company, Tokyo (JP)

(72) Inventor: Yosuke Oshino, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 182 days.

(21) Appl. No.: 18/231,248

(22) Filed: Aug. 8, 2023

(65) Prior Publication Data

US 2023/0419465 A1    Dec. 28, 2023

Related U.S. Application Data

(63) Continuation of application No. PCT/JP2021/046496, filed on Dec. 16, 2021.

(30) Foreign Application Priority Data

Feb. 12, 2021  (JP) .................. 2021-021159

(51) Int. Cl.
- *G06T 5/50* (2006.01)
- *G06T 7/20* (2017.01)
- *G06V 40/10* (2022.01)

(52) U.S. Cl.
CPC .................. *G06T 5/50* (2013.01); *G06T 7/20* (2013.01); *G06V 40/10* (2022.01);
(Continued)

(58) Field of Classification Search
CPC ... G06T 5/50; G06T 7/20; G06T 2207/20221; G06T 2207/30196; G06V 40/10; G06V 2201/07

See application file for complete search history.

(56) References Cited

U.S. PATENT DOCUMENTS

| 2006/0170652 A1* | 8/2006 | Bannai .................... G06F 3/011 345/156 |
| 2008/0024523 A1* | 1/2008 | Tomite .................. G06T 19/006 345/632 |

(Continued)

FOREIGN PATENT DOCUMENTS

| JP | 2003308527 A | * 10/2003 |
| JP | 2010-102588 A | 5/2010 |

(Continued)

OTHER PUBLICATIONS

Japanese Office Action issued Feb. 4, 2025 in corresponding Japanese Patent Application No. 2022-171065, 5 pages.

(Continued)

*Primary Examiner* — Terrell M Robinson
(74) *Attorney, Agent, or Firm* — XSENSUS LLP

(57) ABSTRACT

An information processing device including processing circuitry. The information processing device, by the processing circuitry, is configured to register a designated image; receive a request for a combination image; acquire a context of the registered image by analyzing the image in response to the request; acquire parameter values related to the registered image among parameter values updated according to an activity of a user; determine an object from the acquired context and the acquired parameter values; and combine the determined object with the registered image and present a combination image to the user.

19 Claims, 15 Drawing Sheets

(52) U.S. Cl.
CPC ............... *G06T 2207/20221* (2013.01); *G06T 2207/30196* (2013.01); *G06V 2201/07* (2022.01)

(56) References Cited

U.S. PATENT DOCUMENTS

| | | | | |
|---|---|---|---|---|
| 2010/0315433 | A1* | 12/2010 | Takeshita | G09G 5/14 |
| | | | | 345/632 |
| 2020/0356224 | A1* | 11/2020 | Wilson | G06F 3/0484 |
| 2023/0347104 | A1* | 11/2023 | Blahnik | G06F 3/011 |

FOREIGN PATENT DOCUMENTS

| | | | | |
|---|---|---|---|---|
| JP | 2011-098102 | A | | 5/2011 |
| JP | 2014216658 | A | | 11/2014 |
| JP | 2015023486 | A | | 2/2015 |
| JP | 2018147151 | A | * | 9/2018 |
| JP | 2020087428 | A | | 6/2020 |

OTHER PUBLICATIONS

Notice of Reasons for Refusal mailed on Feb. 24, 2022, received for JP Application 2021-021159, 8 pages including English Translation.
International Search Report and Written Opinion mailed on Mar. 1, 2022, received for PCT Application PCT/JP2021/046496, filed on Dec. 16, 2021, 9 pages including English Translation.
English translation of Written Opinion mailed on Mar. 1, 2022, in corresponding PCT/JP2021/046496, 4 pages.

* cited by examiner

Fig. 4

IMAGE INFORMATION DB 281

| IMAGE ID | REGISTRANT | REGISTRATION DATE | PHOTOGRAPHER | PHOTOGRAPHING DATE | PLACE | PHOTOGRAPHING DIRECTION | LUMINANCE | SIZE | PHOTOGRAPHING MODE | PHOTOGRAPHING TARGET |
|---|---|---|---|---|---|---|---|---|---|---|
| ID0001 | U0001 | 20YY/MM/DD | U0001 | 20YY/MM/DD | (Lat1, Lon1) | (α1, β1) | L1 | C1 | MODE 1 | EVENT E1 PERSON A |
| ID0002 | U0001 | 20YY/MM/DD | U0002 | 20YY/MM/DD | (Lat2, Lon2) | (α2, β2) | L2 | C2 | MODE 2 | PARK PERSON A |
| ID0003 | U0001 | 20YY/MM/DD | U0003 | 19YY/MM/DD | (Lat3, Lon3) | (α3, β3) | L3 | C3 | MODE 3 | AMUSEMENT PARK PERSON A ATTRACTION A1 |
| ... | ... | ... | ... | ... | ... | ... | ... | ... | ... | ... |

Fig. 5

| PARAMETER DB 282 |||
|---|---|---|
| USER ID | PARAMETER ITEM | VALUE |
| U0001 | UPDATE DATE | 20YY/MM/DD HH:MM:SS |
| | NUMBER OF VISITS PLACE P1 | 20YY/MM/DD |
| | | 20YY/MM/DD |
| | | ... |
| | | X TIMES |
| | NUMBER OF VISITS PLACE P2 | 20YY/MM/DD |
| | | 20YY/MM/DD |
| | | ... |
| | | X TIMES |
| | NUMBER OF TIMES PHOTOGPHAPING HAS BEEN PERFORMED PLACE P1 | 20YY/MM/DD |
| | | 20YY/MM/DD |
| | | ... |
| | | X TIMES |
| | NUMBER OF TIMES PHOTOGPHAPING HAS BEEN PERFORMED PLACE P2 | 20YY/MM/DD |
| | | 20YY/MM/DD |
| | | ... |
| | | X TIMES |
| | NUMBER OF STEPS | 20YY/MM/DD : F1 |
| | | 20YY/MM/DD : F2 |
| | | ... |
| | | F STEPS |
| | MOVEMENT DISTANCE | 20YY/MM/DD : D1 km |
| | | 20YY/MM/DD : D2 km |
| | | ... |
| | | D km |
| | ARRIVAL POINT | (Lat1, Lon1) |
| | | (Lat2, Lon2) |
| | | (Lat3, Lon3) |
| | | ... |
| | NUMBER OF TIMES PHOTOGRAPHING HAS BEEN PERFORMED EVENT E1 | 20YY/MM/DD |
| | | 20YY/MM/DD |
| | | ... |
| | | X TIMES |
| | TOTAL NUMBER OF TIMES PHOTOGRAPHING HAS BEEN PERFORMED | |
| | ... | |

Fig. 6

| OBJECT INFORMATION DB /283 ||||||||
|---|---|---|---|---|---|---|
| OBJECT ID | CLASSIFICATION | RELATED CONTEXT | CONTENT ||||
| | | | LEVEL 1 | LEVEL 2 | LEVEL 3 | LEVEL 4 |
| OBJECT 1 | PERSON | BASEBALL GROUND OO | PERSON 1 | PERSON 2 | PERSON 3 | PERSON 4 |
| OBJECT 2 | CHARACTER | AMUSEMENT PARK | CHARACTER 1 | CHARACTER 2 | CHARACTER 3 | CHARACTER 4 |
| OBJECT 3 | OBJECT | PARK | OBJECT 1 | OBJECT 2 | OBJECT 3 | OBJECT 4 |
| OBJECT 4 | TEXT | BIRTHDAY | TEXT 1 | TEXT 2 | TEXT 3 | TEXT 4 |
| ... | ... | | ... | ... | ... | ... |

PROGRAM, METHOD, INFORMATION PROCESSING APPARATUS, AND SYSTEM FOR GENERATING A COMBINATION IMAGE

CROSS-REFERENCE TO RELATED APPLICATIONS

This application is a continuation of International Application No. PCT/JP2021/046496, filed Dec. 16, 2021, which claims priority to JP 2021-021159, filed Feb. 12, 2021, the entire contents of each are incorporated herein by reference.

BACKGROUND

Technical Field

The present disclosure relates to a program, method, information processing apparatus, and system.

Description of the Related Art

In order to keep a memory of a predetermined event, it is common to capture a scene of the event in an image such as a photograph using a photographing apparatus.

CITATION LIST

Patent Literature

[PTL 1] Japanese Patent Application Publication No. 2011-98102

SUMMARY

Technical Problems

It is good to take pictures of a scene of an event as a memory, but when the pictures are left as they are, that the pictures have been taken may be forgotten. Further, although a person expects himself or herself to review captured images someday, it is rare for the person to voluntarily review the images without some motivation.

There is also a technology for using captured images to grow an organism (see PTL 1), but in this technology, since the capturing is performed in order to output an image of the growth of the organism at the time of capturing, looking back on the captured image is not taken into consideration.

An object of the present disclosure is to assign new interest to looking back on and reviewing past images.

Solutions to Problems

A program to be executed by a computer includes a processor and a memory. The program causes the processor to execute: registering a designated image; receiving a request for a combination image; acquiring a context of a registered image by analyzing the image in response to the request; acquiring parameter values related to the registered image among parameter values updated according to an activity of a user; determining an object from the acquired context and the acquired parameter values; and combining the determined object with the registered image and presenting a combination image to the user.

Advantages

According to the present disclosure, it is possible to assign new interest to looking back on and reviewing past images.

BRIEF DESCRIPTION OF DRAWINGS

FIG. 4 is a diagram illustrating a data structure of an image information DB.

FIG. 5 is a diagram illustrating a data structure of a parameter DB.

FIG. 6 is a diagram illustrating a data structure of an object information DB.

DETAILED DESCRIPTION

Figure 1:
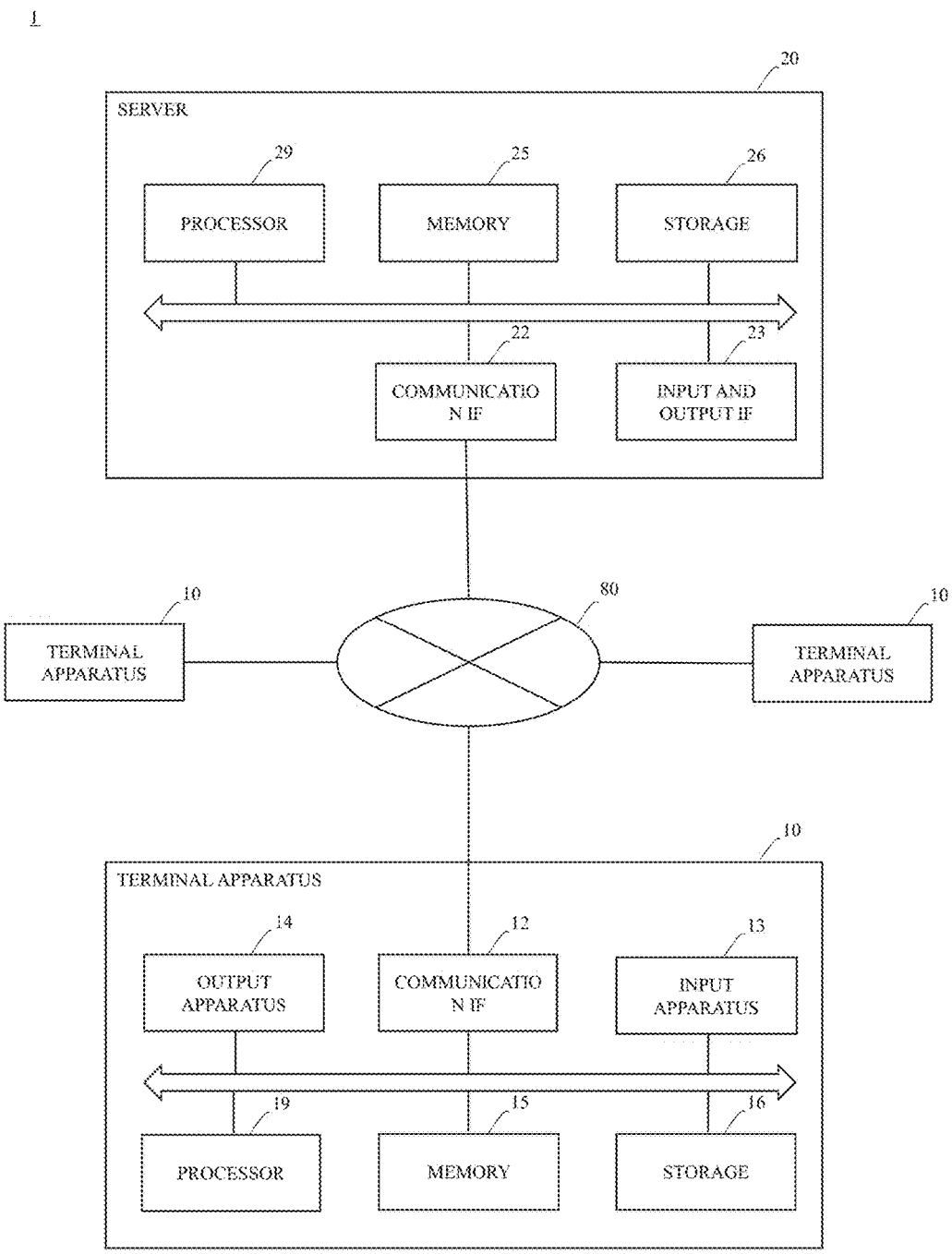
FIG. 1 is a block diagram illustrating an overall configuration of a system.

Hereinafter, embodiments of the present disclosure will be described with reference to the drawings. In the following description, the same parts are denoted by the same reference numerals. Names and functions thereof are also the same. Therefore, detailed description thereof will not be repeated.

Overview

A system according to an embodiment is a system that superimposes an image according to a predetermined parameter on an image captured in the past, thereby assigning new interest to looking back on and reviewing past images.

1 Configuration Diagram of Overall System

FIG. 1 is a block diagram illustrating an example of an overall configuration of a system 1. The system 1 illustrated in FIG. 1 includes a plurality of terminal apparatuses 10, and a server 20. The terminal apparatus 10 and the server 20 are communicatively connected via a network 80.

Although an example in which the system 1 includes three terminal apparatuses 10 is illustrated in FIG. 1, the number of terminal apparatuses 10 included in the system 1 is not limited to three. The number of terminal apparatuses 10 may be less than three or may be three or more.

In the present embodiment, a set of a plurality of apparatuses may be used as one server. A method of distributing a plurality of functions required to realize the server 20 according to the present embodiment to one or a plurality of pieces of hardware can be determined appropriately in consideration of, for example, processing capability of each piece of hardware and/or a specification required for the server 20.

The terminal apparatus 10 is, for example, an apparatus operated by a user who receives the combination image from the server 20. The terminal apparatus 10 may be, for example, a mobile terminal such as a smartphone or tablet, or may be a stationary personal computer (PC) or a laptop PC.

The terminal apparatus 10 includes a communication interface (IF) 12, an input apparatus 13, an output apparatus 14, a memory 15, a storage 16, and a processor 19.

The communication IF 12 is an interface for inputting and outputting signals so that the terminal apparatus 10 communicates with an external apparatus.

The input apparatus 13 is an apparatus (for example, a touch panel, a touch pad, or a pointing device such as a mouse or a keyboard) for receiving an input operation from the user.

The output apparatus 14 is an apparatus (a display, a speaker, or the like) for presenting information to the user.

The memory 15 is intended to temporarily store, for example, programs and data processed by the programs or the like, and is, for example, a volatile memory such as a dynamic random access memory (DRAM).

The storage 16 is intended to store data, and is, for example, a flash memory or a hard disc drive (HDD).

The processor 19 is hardware for executing an instruction set described in a program, and is configured of an arithmetic unit, a register, a peripheral circuit, and the like.

The server 20 is, for example, an apparatus that provides a combination image to the user. The combination image according to the embodiment is an image obtained by combining a predetermined object with an image captured by the user in the past in a predetermined aspect. The image captured by the user in the past may be a still image or a moving image. The object includes, for example, a person, a character, an object, or text. The aspect includes a size, color, angle, moving image, still image, or the like.

The server 20 includes a communication IF 22, an input and output IF 23, a memory 25, a storage 26, and a processor 29.

The communication IF 22 is an interface for inputting and outputting signals for the server 20 to communicate with an external apparatus.

The input and output IF 23 functions as an interface with an input apparatus for receiving an input operation from the user and an output apparatus for presenting information to the user.

The memory 25 is intended to temporarily store, for example, programs and data processed by the programs or the like, and is, for example, a volatile memory such as a dynamic random access memory (DRAM).

The storage 26 is intended to store data, and is, for example, a flash memory or a hard disc drive (HDD).

A processor 29 is hardware for executing an instruction set described in a program, and is configured of an arithmetic unit, a register, a peripheral circuit, and the like.

<1.1 Configuration of Terminal Apparatus>

Figure 2:
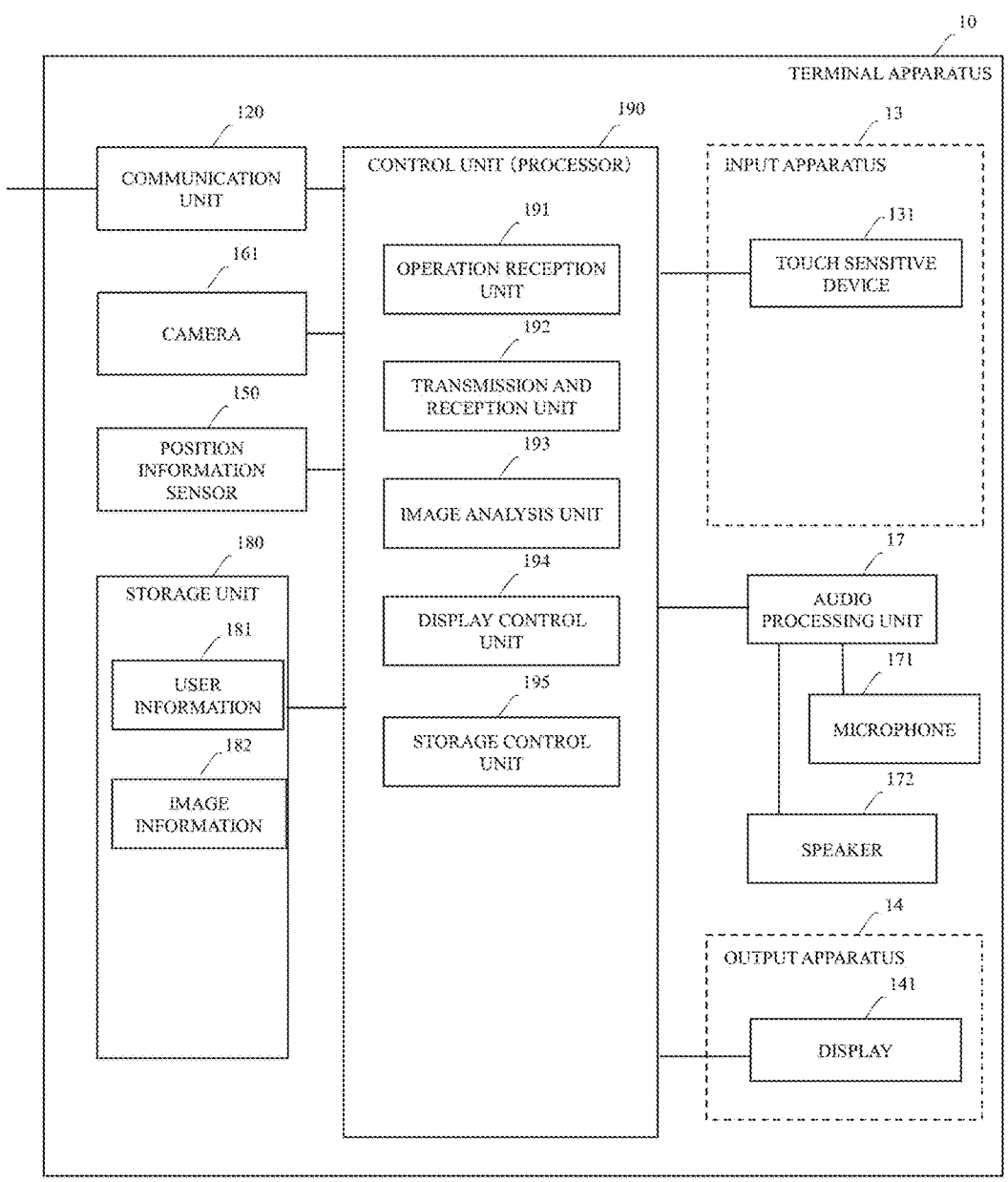
FIG. 2 is a block diagram illustrating a configuration of a terminal apparatus illustrated in FIG. 1.

FIG. 2 is a block diagram illustrating a configuration example of the terminal apparatus 10 illustrated in FIG. 1. As illustrated in FIG. 2, the terminal apparatus 10 includes a communication unit 120, an input apparatus 13, an output apparatus 14, an audio processing unit 17, a microphone 171, a speaker 172, a camera 161, a position information sensor 150, a storage unit 180, and a control unit 190. Respective blocks included in the terminal apparatus 10 are electrically connected by, for example, a bus.

The communication unit 120 performs processing such as modulation or demodulation processing for the terminal apparatus 10 communicating with another apparatus. The communication unit 120 performs transmission processing on a signal generated by the control unit 190 and transmits a resultant signal to the outside (for example, the server 20). The communication unit 120 performs reception processing on a signal received from the outside, and outputs a resultant signal to the control unit 190.

The input apparatus 13 is an apparatus that is used for a user who operates the terminal apparatus 10 to input an instruction or information. The input apparatus 13 is realized by, for example, a touch sensitive device 131 to which an instruction is input by touching an operation surface. When the terminal apparatus 10 is a PC or the like, the input apparatus 13 may be realized by a reader, keyboard, mouse, or the like. The input apparatus 13 converts an instruction input from the user into an electrical signal and outputs the electrical signal to the control unit 190. The input apparatus 13 may include, for example, a reception port for receiving an electrical signal input from an external input device.

The output apparatus 14 is an apparatus for presenting information to the user who operates the terminal apparatus 10. The output apparatus 14 is realized by, for example, a display 141. The display 141 displays data under the control of the control unit 190. The display 141 is realized by, for example, a liquid crystal display (LCD) or an organic Electro-Luminescence (EL) display.

The audio processing unit 17 performs digital-to-analog conversion processing of an audio signal, for example. The audio processing unit 17 converts a signal from the microphone 171 into a digital signal and supplies a signal after conversion to the control unit 190. Further, the audio processing unit 17 provides an audio signal to the speaker 172. The audio processing unit 17 is realized by, for example, a processor for audio processing. The microphone 171 receives an audio input and provides an audio signal corresponding to the audio input to the audio processing unit 17. The speaker 172 converts the audio signal given from the audio processing unit 17 into audio and outputs the audio to the outside of the terminal apparatus 10.

The camera 161 is a device for receiving light using a light reception element and outputting the light as a photographing signal.

The position information sensor 150 is a sensor that detects a position of the terminal apparatus 10, and is, for example, a global positioning system (GPS) module. The GPS module is a reception apparatus that is used in a satellite positioning system. The satellite positioning system receives signals from at least three or four satellites, and detects a current position of the terminal apparatus 10 including a GPS module on the basis of the received signals.

The storage unit 180 is realized by, for example, the memory 15 and the storage 16, and stores data and programs that are used by the terminal apparatus 10. The storage unit 180 stores user information 181 and image information 182, for example.

The user information 181 includes, for example, information on a user who uses the terminal apparatus 10. The information on the user includes, for example, information for identifying the user, and a name, age, address, date of birth, telephone number, email address, and predetermined account information of the user.

The user information 181 includes parameters for the user (for example, information based on the activity of the user or information on photographing). The parameters for the user are acquired by, for example, sensors provided in the terminal apparatus 10 (a position information sensor 150, the camera 161, an acceleration sensor (an inertial sensor may be used), a gyro sensor, and the like. Further, the parameters for the user may be acquired by a timer function provided in the terminal apparatus 10. Further, the parameters for the user may be acquired through cooperation with a server that provides a predetermined service used by the user, for example. The parameters for the user include, for example, the following:

- Information based on the activity of the user (information on a movement of the user such as the number of steps, a movement distance, and a movement route or information on photographing of the user such as the fact that the user has performed photographing at a predetermined place or the total number of times photographing has been performed)
- Information based on an activity of another user (family, a friend, or the like) associated with the user
- Information on the passage of time (time that has elapsed from photographing, or the number of days that have elapsed)

The information based on the activity of the other user associated with the user includes, for example, the information on the movement of the user such as the number of steps, a movement distance, and a movement route, or information on photographing of the other user such as the fact that the other user has performed photographing at a predetermined place, and the total number of times photographing has been performed, when a predetermined image is jointly managed on a cloud with the other user.

The image information 182 is information on the image based on the photographing signal. The image information 182 includes, for example, the pixel information representing the image, and meta information which is additional information on the image.

The meta information includes, for example, information for identifying an image, and information for identifying a photographer, photographing date, photographing place, photographing direction, luminance, hue, photographing mode, and photographing target. The photographing place represents a place at which the image has been captured, and is based on information acquired by the position information sensor 150, for example. The photographing direction represents a direction in which the image has been captured, and is based on information acquired by a geomagnetic sensor and a gyro sensor provided in the terminal apparatus 10, for example. The luminance represents brightness of the image, and is based on, for example, information set when the image has been captured. The hue represents coloration of the image and is obtained, for example, by analyzing the pixel information. The photographing mode represents a mode when the image has been captured, and is based on information set when the image has been captured, for example. The photographing target represents an object included in the image and is obtained by analyzing the pixel information, for example.

Some terminal apparatuses 10 do not have a function of analyzing an image (the pixel information). In this case, the image information 182 may not include, for example, hue or a photographing target.

The control unit 190 is realized by the processor 19 reading the program stored in the storage unit 180 and executing instructions included in the program. The control unit 190 controls an operation of the terminal apparatus 10. The control unit 190 functions as an operation reception unit 191, a transmission and reception unit 192, an image analysis unit 193, a display control unit 194, and a storage control unit 195 by operating according to the program.

The operation reception unit 191 performs processing for receiving an instruction or information input from the input apparatus 13. Specifically, for example, the operation reception unit 191 receives information based on an instruction input from the touch sensitive device 131 or the like. The instruction input via the touch sensitive device 131 or the like is, for example, as follows.

- Instruction to register an image in the server 20
- Instruction to request the server 20 to provide the combination image Further, the operation reception unit 191 receives an audio instruction input from the microphone 171. Specifically, for example, the operation reception unit 191 receives an audio signal input from the microphone 171 and converted into a digital signal by the audio processing unit 17. The operation reception unit 191 acquires an instruction from the user, for example, by analyzing the received audio signal and extracting a predetermined noun.

The transmission and reception unit 192 performs processing for the terminal apparatus 10 transmitting or receiving data to or from an external apparatus such as the server 20 according to a communication protocol. Specifically, for example, the transmission and reception unit 192 transmits an instruction to register an image and image information to be registered to the server 20. Further, the transmission and reception unit 192 transmits the instruction to request the combination image to the server 20.

Further, the transmission and reception unit 192 transmits at least part of the user information 181 to the server 20. For example, the transmission and reception unit 192 transmits information to the server 20 at the following timings, for example.

- Predetermined period
- When an action is detected by a sensor
- In response to an input from the user (for example, an input of an image registration instruction, or an input of a combination image request instruction)

The image analysis unit 193 analyzes the photographing signal from the camera 161. Specifically, the image analysis unit 193 analyzes the pixel information and acquires information included in the image. For example, the image analysis unit 193 acquires hue as the information included in the image. Further, the image analysis unit 193 acquires a photographed person, place, object, event, or the like as information contained in the image. The image analysis unit 193 may not exist depending on the terminal apparatus 10.

The display control unit 194 controls the output apparatus 14 to present the image provided by the server 20 to the user. Specifically, for example, the display control unit 194 causes the display 141 to display an image based on information transmitted from the server 20.

The storage control unit 195 controls storage of data in the storage unit 180. For example, the storage control unit 195 stores the parameters for the user in the user information 181, for example. Specifically, for example, the storage control unit 195 stores a movement distance, a movement route, and the like acquired by the position information sensor 150 in the user information 181. Further, the storage control unit 195 stores the number of steps acquired by the acceleration sensor in the user information 181, for example. Further, the storage control unit 195 stores the total number of times photographing has been performed acquired by the camera 161, information on photographing at a predetermined place, and the like in the user information 181. Further, the storage control unit 195 stores information provided by a predetermined server in the user information 181. Further, the storage control unit 195 stores a time elapsed from the predetermined reference point in the user information 181.

The storage control unit 195 also stores information on the image captured by the camera 161 in the image information 182. Specifically, for example, the storage control unit 195 stores information on the image based on the photographing signal acquired by the camera 161 in the image information 182.

<1.2 Functional Configuration of Server>

Figure 3:
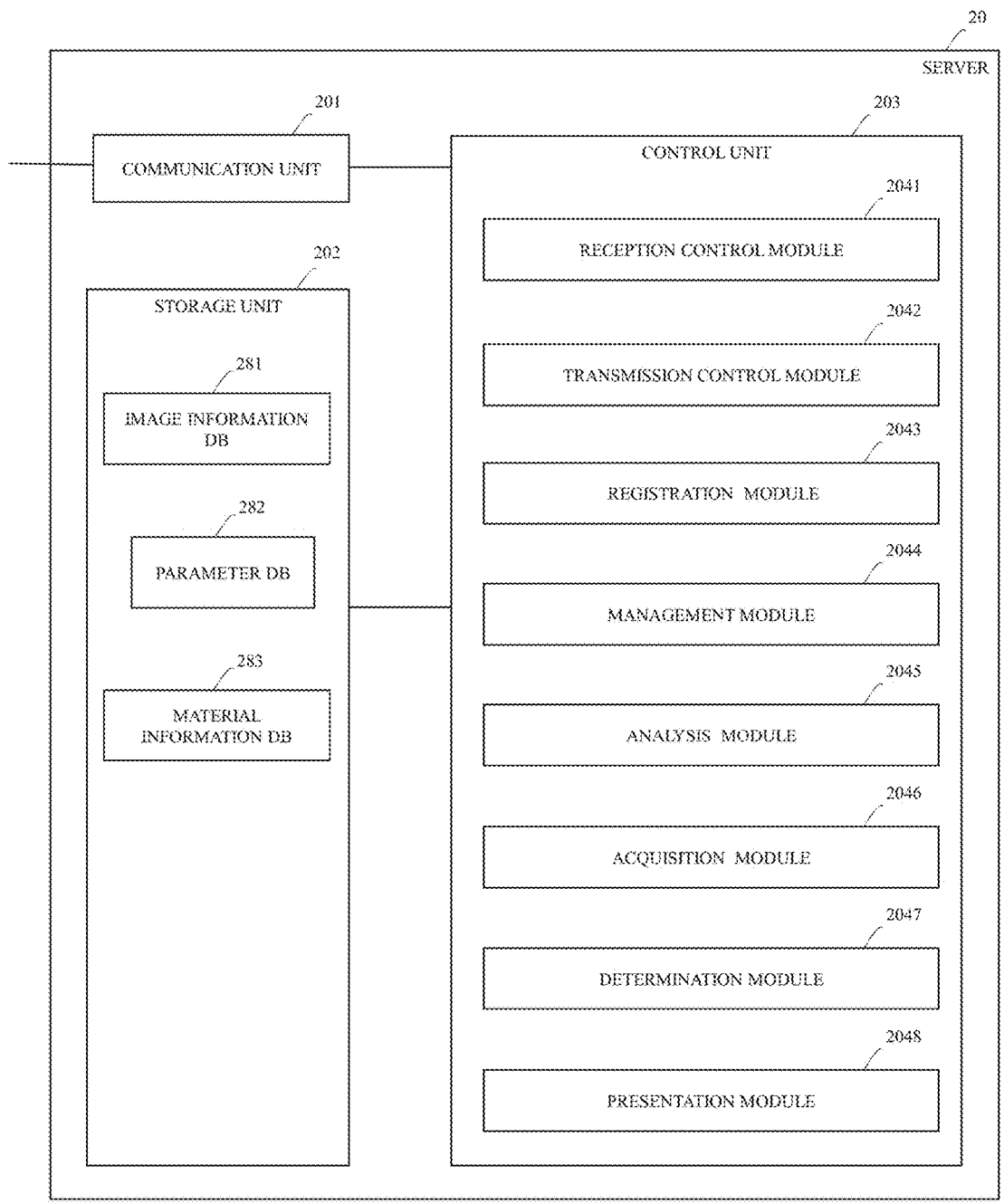
FIG. 3 is a diagram illustrating a functional configuration of a server.

FIG. 3 is a diagram illustrating an example of a functional configuration of the server 20. As illustrated in FIG. 3, the server 20 functions as a communication unit 201, a storage unit 202 and a control unit 203.

The communication unit 201 performs processing for the server 20 communicating with an external apparatus.

The storage unit 202 includes databases that store data for generating the combination image, such as an image information database (DB) 281, a parameter database (DB) 282, and an object information database (DB) 283.

The image information DB 281 is a database for holding information on images registered by users. Details will be described below.

The parameter DB 282 is a database for holding information managed for users who receive services. In the parameter DB 282, a parameter value indicating, for example, the activity of the user is managed with an item corresponding to the registered image. Hereinafter, the item managed by the parameter DB 282 is referred to as a parameter item. Details will be described below.

The object information DB 283 is a database for holding information on objects to be combined with the image. Details will be described below.

The control unit 203 is realized by the processor 29 reading a program stored in the storage unit 202 and executing instructions included in the program. The control unit 203 operates according to the program to perform functions shown as a reception control module 2041, a transmission control module 2042, a registration module 2043, a management module 2044, an analysis module 2045, an acquisition module 2046, a determination module 2047, and a presentation module 2048.

The reception control module 2041 controls processing for the server 20 receiving a signal from an external apparatus according to a communication protocol.

The transmission control module 2042 controls processing for the server 20 transmitting a signal to an external apparatus according to a communication protocol.

The registration module 2043 controls processing for registering images specified by the user. For example, when the registration module 2043 receives an instruction to register an image and the image information on the image from the user, the registration module 2043 stores the received image information in the image information DB 281.

The management module 2044 manages parameters for the user. For example, when at least part of the user information 181 is received from the terminal apparatus 10, the management module 2044 updates the parameter DB 282 on the basis of the received information. Specifically, for example, when an image is registered, the management module 2044 sets the parameter items regarding the registered image. The management module 2044 sets, for example, an item related to the passage of time (for example, the number of days, the number of months, or the number of years), an item related to the number of experiences regarding a place (for example, the number of visits or the number of times photographing has been performed), an item related to a movement (for example, the number of steps, a movement distance, or a reached point), the total number of times photographing has been performed, or the like as a parameter item.

The management module 2044 updates a value of the parameter item on the basis of the information on the movement of the user included in the received information. For example, the management module 2044 ascertains that a predetermined place has been visited, on the basis of the information on the movement of the user. Further, the management module 2044 manages the number of visits to the predetermined place.

Further, the management module 2044 ascertains that the user has performed photographing at the predetermined place from the information on photographing of the user, which is included in the received information. Further, the management module 2044 manages the number of times photographing has been performed at the predetermined place.

Further, the management module 2044 updates the value of the parameter item on the basis of the information based on the activity of the other user associated with the user, which is included in the received information. The management module 2044 may receive the information based on the activities of the other user associated with the user from a server providing a predetermined service.

Further, the management module 2044 updates the value of the parameter item on the basis of the information on the passage of time included in the received information.

The management module 2044 may set the parameter items on the basis of an instruction from the administrator of the server 20 or the user. For example, the management module 2044 may set, as the parameter item, a condition imposed by an administrator, such as a so-called quota. For example, the management module 2044 may set, as the parameter item, a condition imposed by the user, such as quotas.

The analysis module 2045 controls analysis processing for the image information. For example, the analysis module 2045 analyzes information on a predetermined first image among the images registered in the image information DB 281, and acquires the context included in the first image. In the present embodiment, the context represents, for example, context when the image has been captured, in other words, a meaning with which the image is captured, a significance with which the image is captured, a scene in which the image has been captured, or the like. The analysis module 2045 acquires one or a plurality of contexts from a plurality of contexts registered in the storage unit 202 in advance on the basis of the information included in the image information. For example, the analysis module 2045 acquires the following information as the context by performing image analysis on the pixel information included in the image information.

Being at a place at which there is a building (an amusement park, baseball ground, soccer stadium, track and field stadium, live venue, or the like) appearing in the image There is a person appearing in the image (a user himself or herself, a person registered by the user, a person who can be discriminated on the basis of a public database, or the like)

Being with a character appearing in the image (a character registered by the user, a character that can be discriminated on the basis of a public database, or the like)

An event (a birthday, Christmas, Halloween, or the like) appearing in the image is being held There is an object (a cake, Christmas tree, Jack-o'-Lantern, or the like) appearing in the image.

Atmosphere of the image

The atmosphere of the image may be determined from the hue of the image, or may be determined from facial expression of the person appearing in the image.

Further, the analysis module 2045 acquires the following information as context, for example, on the basis of the meta information included in the image information.

The image has been captured on a predetermined date
The image has been captured at a predetermined place
The image has been captured in a predetermined direction
The image is in a predetermined atmosphere (based on coloration)
The image includes a predetermined photographing target (object, person, character, event, or the like)

The analysis module 2045 may perform image analysis processing on the pixel information included in the image information, and processing for extracting meta information included in the image information, or may perform any one of the processing.

The analysis module 2045 determines an image satisfying predetermined requirements among the registered images as the first image. Predetermined requirements are, for example, the following.

Image designated by user
Randomly selected image
Image related to a current date (images captured on the same day, images captured on the same month, or the like)
Image related to the current place (images captured at the same place, images captured at different places within the same facility, or the like)
Image related to an event that is currently presumed to be in progress (images for the same event, and images for a series of events)
Image satisfying predetermined photographing conditions (an image including a predetermined target, an image captured in a predetermined direction, an image captured at a predetermined luminance, an image with a predetermined hue, or the like)

The acquisition module 2046 controls the acquisition of parameter values regarding the image. For example, the acquisition module 2046 refers to the parameter DB 282 to acquire a value of a predetermined parameter item for the first image analyzed by the analysis module 2045 among the registered images.

Specifically, the acquisition module 2046 selects the item of the parameter to be acquired for the first image. The acquisition module 2046 selects the set the parameter items. Here, the value of the parameter item may change between an image capturing timing or a registration timing and image combination processing. For example, the acquisition module 2046 selects at least one of the number of elapsed days, the number of visits, the number of times photographing has been performed, the number of steps, the movement distance, the reached point, the total number of times photographing has been performed, and the like, as the parameter item.

The acquisition module 2046 may select any one of the parameter terms on the basis of the context acquired by the analysis module 2045, for example. For example, when the analysis module 2045 acquires the context of being at a predetermined baseball ground, the acquisition module 2046 selects the number of visits to this baseball ground as the parameter item. Further, for example, when the analysis module 2045 acquires an image being captured a long time ago (an image captured on a predetermined date) as a context, the acquisition module 2046 selects the number of days that have elapsed since this image has been registered or the number of days that have elapsed since the image has been captured, as the parameter item.

Further, the acquisition module 2046 may randomly select any one of the parameter items regardless of the acquired context.

The acquisition module 2046 acquires the value of the selected parameter item on the basis of the parameter DB 282. For example, when the number of visits is selected as the parameter item, the acquisition module 2046 acquires the number of visits to a predetermined place, which is stored in the parameter DB 282.

Further, for example, when the number of elapsed days is selected as the parameter item, the acquisition module 2046 calculates the number of days that have elapsed since the image has been registered on the basis of the update date stored in the parameter DB 282 and the registration date stored in the image information DB 281. Further, the acquisition module 2046 may acquire the number of days that have elapsed since the image has been captured, on the basis of the update date stored in the parameter DB 282 and the photographing date stored in the image information DB 281.

The determination module 2047 determines an object to be combined with the image, and an aspect of the object. For example, the determination module 2047 determines the object on the basis of the context acquired by the analysis module 2045. In the present embodiment, the object is classified into, for example, a character, person, object, and letter, and is content according to the classification.

The determination module 2047 determines a level of the determined object on the basis of the value of the parameter item acquired by the acquisition module 2046. In the present embodiment, the level of the object represents, for example, gorgeousness of the object or a degree of change in the object. The gorgeousness of the object is represented by, for example, the following when the classification of the object is a character.

The number of characters (the number increases when the level goes up)
Possessions of the character (the number of possessions increases and the possessions are larger when the level goes up)
Facial expressions of the character (more smiles when the level goes up)
A degree of evolution of the character (the character becomes an evolved shape when the level goes up)
The character moves (the character that does not move when the level is low moves when the level is high, and a movement of the character changes when the level goes up)

The determination module 2047 determines a display aspect of the object on the basis of a configuration within the image. For example, the determination module 2047 determines a position, size, angle, or the like for combining the determined object on the basis of a position, size, shape, or the like of an object-free region in the image.

The presentation module 2048 presents to the user the combination image obtained by combining the first image of any one of the registered images with a second image of a predetermined object. Specifically, for example, the presentation module 2048 creates the second image on the basis of the object determined by the determination module 2047 and the display aspect of the object. The presentation module 2048 combines the created second image with the first image to create the combination image. The presentation module 2048 presents the created combination image to the user.

2 Data Structure

FIGS. 4 to 6 are diagrams illustrating a data structure of the database stored by the server 20. FIGS. 4 to 6 are only examples, and data not described is not excluded.

FIG. 4 is a diagram illustrating a data structure of the image information DB 281. As illustrated in FIG. 4, respective records of the image information DB 281 include, for example, an item "image ID", an item "registrant", an item "registration date", an item "photographer", an item "photographing date", an item "place", an item "photographing direction (azimuth, elevation angle)", an item "luminance", an item "hue", an item "photographing mode", and an item "photographing target". Each record is associated with the pixel information.

The item "image ID" stores information for identifying an image. The image ID is automatically set, for example, when image information is registered.

The item "registrant" stores a name of the user who has registered the image. The item "registrant" may store a user ID for identifying the user.

The item "registration date" stores the date when the user has registered the image.

The item "photographer" stores the name of the user who has taken the image. The item "photographer" may store a user ID for identifying the user.

The item "photographing date" stores the date when the image has been captured.

The item "place" stores a place in which the user has captured the image. The item "place" is represented by a longitude and latitude, for example.

The item "photographing direction" stores a direction in which the user has captured the image. The item "photographing direction" is represented by, for example, an azimuth angle and an elevation angle.

The item "luminance" stores luminance set when the user has captured the image.

The item "hue" stores coloration included in the image.

The item "photographing mode" stores a photographing mode set when the user has captured the image.

The item "photographing target" stores an object determined to be included in the image by post-photographing analysis.

FIG. 5 is a diagram illustrating a data structure of the parameter DB 282. As illustrated in FIG. 5, respective records of the parameter DB 282 include, for example, an item "user ID", an item "parameter item", an item "value".

The item "user ID" stores information for identifying the user.

The item "parameter item" stores an item of the parameter that is being managed. The parameter item is added, for example, when an image is registered.

The item "value" stores the value of the parameter item.

FIG. 6 is a diagram illustrating a data structure of the object information DB 283. As illustrated in FIG. 6, respective records of the object information DB 283 include, for example, an item "object ID", an item "classification", an item "related context", and an item "content".

The item "object ID" stores information for identifying an object.

The item "classification" stores a classification to which the object belongs.

The item "associated context" stores the context associated with the object.

The item "content" stores content of the object. The item "content" includes a plurality of sub-items. In the present embodiment, the item "content" is set for each level. In each object, a sub-item "level 1", a sub-item "level 2", a sub-item "level 3", and a sub-item "level 4" store content according to the level. The content of each level may be set for each parameter item selected by the acquisition module 2046, for example.

3 Operation

An operation of the terminal apparatus 10 and the server 20 when an image regarding an object is combined with an image registered by a user and provided will be described.

Figure 7:
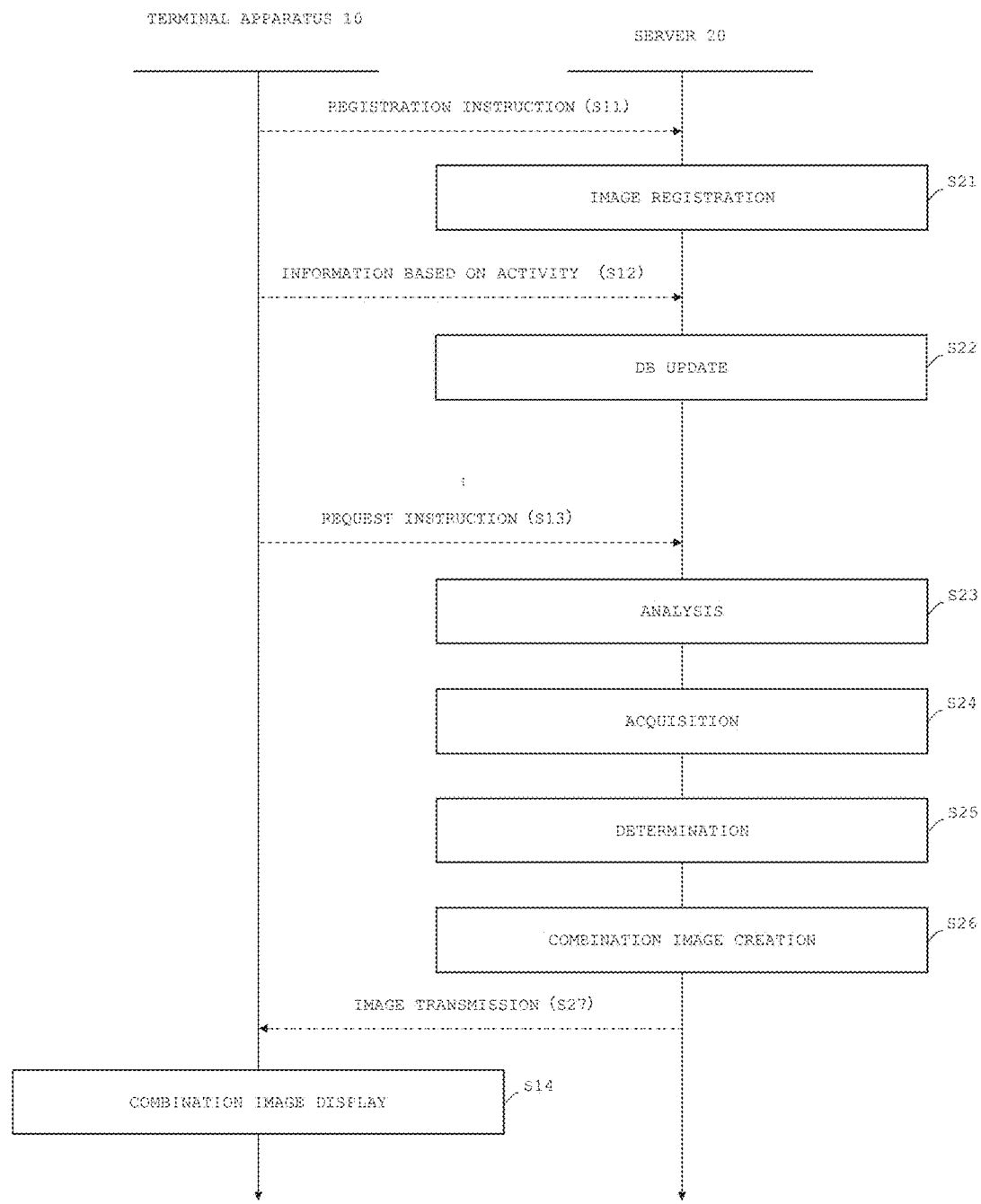
FIG. 7 is a diagram illustrating operations of the terminal apparatus and the server when the combination image is presented to a user.

FIG. 7 is a diagram illustrating an example of an operation of the terminal apparatus 10 and the server 20 when the combination image is presented to the user.

First, the user operates the terminal apparatus 10 to start a service that provides the combination image. The terminal apparatus 10 displays, for example, an image registration screen on a service providing screen. The user selects at least one image from among the images stored in the terminal apparatus 10 on the registration screen. When the user confirms the selection of the image, for example, the user presses a confirmation button displayed on the terminal apparatus 10. When the user selects the image, the terminal apparatus 10 transmits the image registration instruction and information on the selected image to the server 20 (step S11).

When the server 20 receives the image registration instruction and the information on the selected image, the registration module 2043 stores the received image information in the image information DB 281 (step S21). The server 20 creates a parameter term associated with the selected image, on the basis of the received image information, through the management module 2044. The management module 2044 adds the created parameter item to the parameter DB 282.

The terminal apparatus 10 transmits at least part of the user information 181 to the server 20 at a predetermined timing (step S12). For example, the terminal apparatus 10 transmits information to the server 20 regardless of the image registration instruction.

When the server 20 receives the information transmitted from the terminal apparatus 10, the management module 2044 updates the parameter DB 282 on the basis of the received information (step S22). Specifically, for example, the management module 2044 updates a value of each parameter item in the parameter DB 282.

After the terminal apparatus 10 transmits the image registration instruction, the terminal apparatus 10 transmits, to the server 20, an instruction to request the server 20 to present the combination image at a predetermined timing (step S13). For example, the predetermined timing is as follows.

When the user inputs a request for the combination image

When a predetermined date and time is reached

When the activity of the user satisfies a predetermined condition (achievement of a predetermined number of visits, achievement of a predetermined number of times photographing has been performed, achievement of a predetermined number of steps, achievement of a predetermined movement distance, achievement of arrival at a predetermined point, or the like)

When the user performs processing regarding viewing images stored in the image information 182 (when the user opens an album in which images related to the registered images are stored, or when the user views the registered images, or the like)

When the information based on the activity of the other user associated with the user satisfies a predetermined condition The terminal apparatus 10 may receive a designation of an image that is a combination image source from the user. The user selects the image that is the combination image source from among the registered images, and presses the confirmation button. When the terminal apparatus 10 receives the image selection from the user, the terminal apparatus 10 transmits, to the server 20, the instruction to request the combination image and an instruction to select an image.

When the server 20 receives the instruction to request the combination image, the analysis module 2045 determines the first image among the registered images. When the user designates the image that is the combination image source, the analysis module 2045 determines an image designated by the user as the first image. The analysis module 2045 determines the first image on the basis of the information stored in the image information DB 281 and a current situation of the user, for example, when the user does not designate the image that is the combination image source. The analysis module 2045 analyzes information on the determined first image and acquires the context contained in the first image (step S23).

Figure 8:
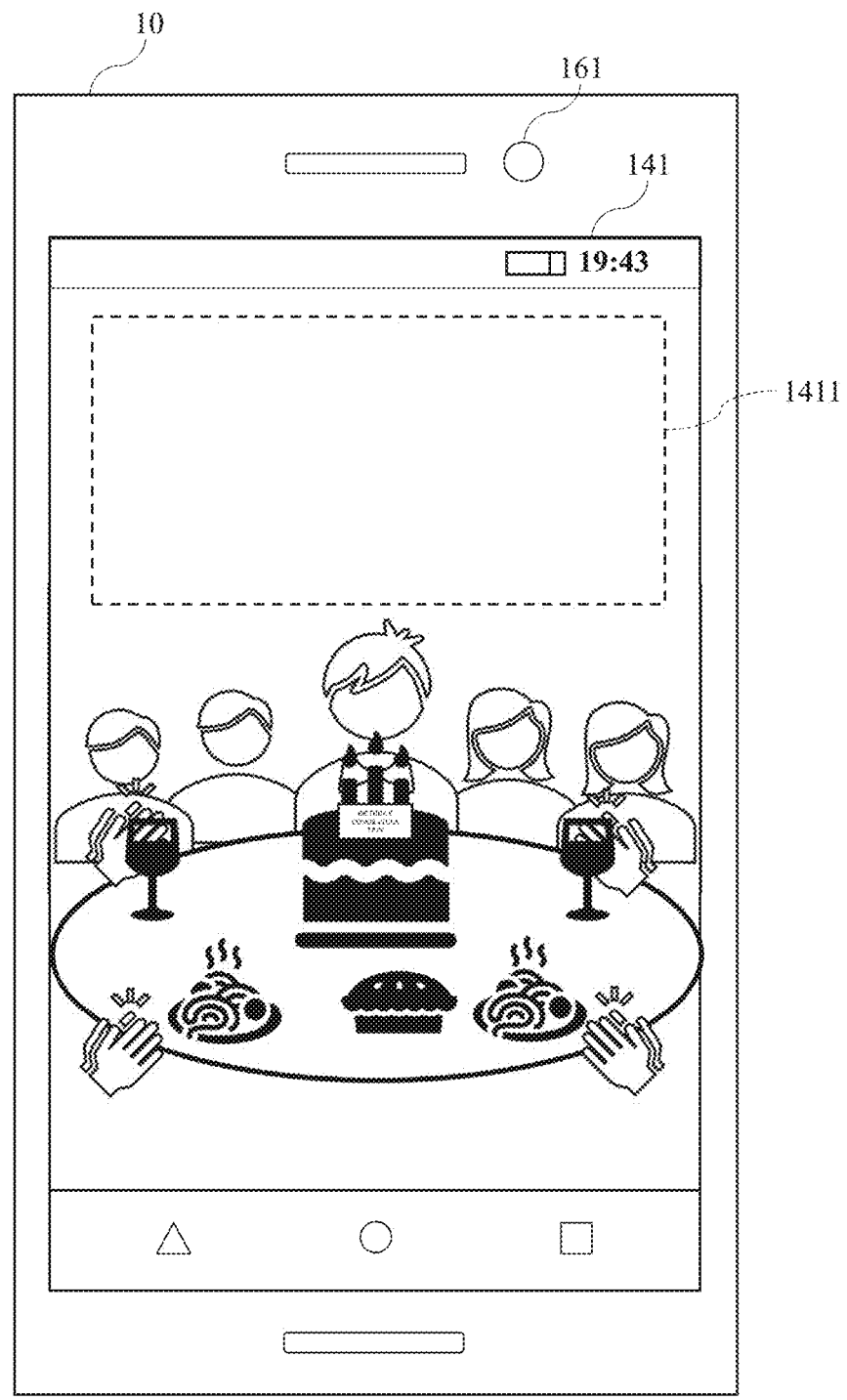
FIG. 8 is a diagram illustrating an image determined as a first image.

FIG. 8 is a diagram illustrating an example of the image determined as the first image. The image illustrated in FIG. 8 has been captured at the time of a birthday celebration. The image illustrated in FIG. 8 includes a celebrated person, a celebrating person, a birthday cake, and the like. Further, meta information including the items described in the image information DB 281, for example, is added to the image illustrated in FIG. 8.

The analysis module 2045 acquires the context from the image illustrated in FIG. 8. For example, the analysis module 2045 acquires a context with content "an image of the birthday party of AAAA held at (longitude: Lat1 and latitude: Lon1) in 20YY/MM/DD", on the basis of the pixel information included in the image information and the information stored in the image information DB 281.

The server 20 acquires the value of the predetermined parameter item for the first image by referring to the parameter DB 282 using the acquisition module 2046 (step S24). Specifically, the acquisition module 2046 selects the item of the parameter to be acquired for the first image. The acquisition module 2046 selects at least one of preset parameter items such as the number of elapsed days, the number of visits, the number of times photographing has been performed, the number of steps, the movement distance, the reached point, the total number of times photographing has been performed, and the like. The acquisition module 2046 acquires the value of the selected parameter item on the basis of the parameter DB 282.

In the example illustrated in FIG. 8, the acquisition module 2046 selects, for example, the parameter item on the basis of the context of "the image of the birthday party of AAAA held at (longitude: Lat1 and latitude: Lon1) in 20YY/MM/DD" acquired by the analysis module 2045. The acquisition module 2046 selects, for example, any one of "the number of times photographing has been performed at (longitude: Lat1 and latitude: Lon1)", "the number of times photographing has been performed at the birthday party", "the number of days that have elapsed since a photographing date", "the number of days that have elapsed since a registration date", and "the total number of times photographing has been performed" as the parameter item. In the present description, for example, it is assumed that the acquisition module 2046 selects "the number of times photographing has been performed at the birthday party" as the parameter item. The acquisition module 2046 refers to the parameter DB 282 to acquire "the number of times photographing has been performed at the birthday party".

The server 20 determines the object to be combined with the first image, the level of the object, and an aspect of the object using the determination module 2047 (step S25). Specifically, the determination module 2047 determines the object on the basis of the context acquired by the analysis module 2045. The determination module 2047 determines a level of the determined object on the basis of the value of the parameter item acquired by the acquisition module 2046. The determination module 2047 determines a display aspect of the object on the basis of a configuration within the image.

In the example illustrated in FIG. 8, the determination module 2047 determines, for example, the object on the basis of the context of "the image of the birthday party of AAAA held at (longitude: Lat1 and latitude: Lon1) in 20YY/MM/DD" acquired by the analysis module 2045. The determination module 2047 selects, for example, an object whose item "relevant context" is a birthday. The determination module 2047 determines, for example, the level of the object according to a value of "the number of times photographing has been performed at the birthday party" determined by the acquisition module 2046. The determination module 2047 sets a plurality of reference values corresponding to the level in advance. The determination module 2047 compares the number of times photographing has been performed with the reference value to determine the level of the object. The determination module 2047 determines a dashed line area 1411 of the first image illustrated in FIG. 8 as an area in which the object is to be combined. The determination module 2047 determines a size, angle, or the like of the object so that the object can be combined with the dashed line area 1411.

The server 20 creates the combination image using the presentation module 2048 (step S26). Specifically, for example, the presentation module 2048 creates the second image on the basis of the object determined by the determination module 2047 and the display aspect of the object. The presentation module 2048 combines the created second image with the first image to create the combination image. The server 20 stores the created combination image in the storage unit 202. The server 20 stores, for example, the combination image in the storage unit 202 as an image different from the first image.

The server 20 presents the created combination image to the user (step S27). Specifically, the server 20 transmits information on the created combination image to the terminal apparatus 10.

The terminal apparatus 10 displays the received combination image on the display 141 (step S14).

Figure 9:
FIG. 9 is a diagram illustrating a combination image displayed on a display.

FIG. 9 is a diagram illustrating an example of a combination image displayed on the display 141. In the combination image illustrated in FIG. 9, a second image 1412 including a text and a character celebrating a birthday is combined.

Content of the combination image created on the basis of the first image is not limited to that illustrated in FIG. 9. When the value of the parameter item increases before the combination image is displayed, the combination image whose object level has increased is displayed.

For example, it is assumed that the value of the predetermined parameter item has increased after the user confirms the combination image illustrated in FIG. 9. Specifically, it is assumed that there are a plurality of opportunities to photograph a birthday party after the user confirms the combination image illustrated in FIG. 9. The birthday party that is a photographing target may be limited to the birthday party of AAAA, or birthday parties of other persons may be permitted. Accordingly, the value of "the number of times photographing has been performed at the birthday party" selected as the parameter item is increased. The user requests the combination image again after a predetermined time has elapsed since the user has requested the combination image illustrated in FIG. 9. The determination module 2047 determines the level of the object according to the increased value of "the number of times photographing has been performed at the birthday party". The presentation module 2048 creates the combination image in which the object becomes gorgeous.

Figure 10:
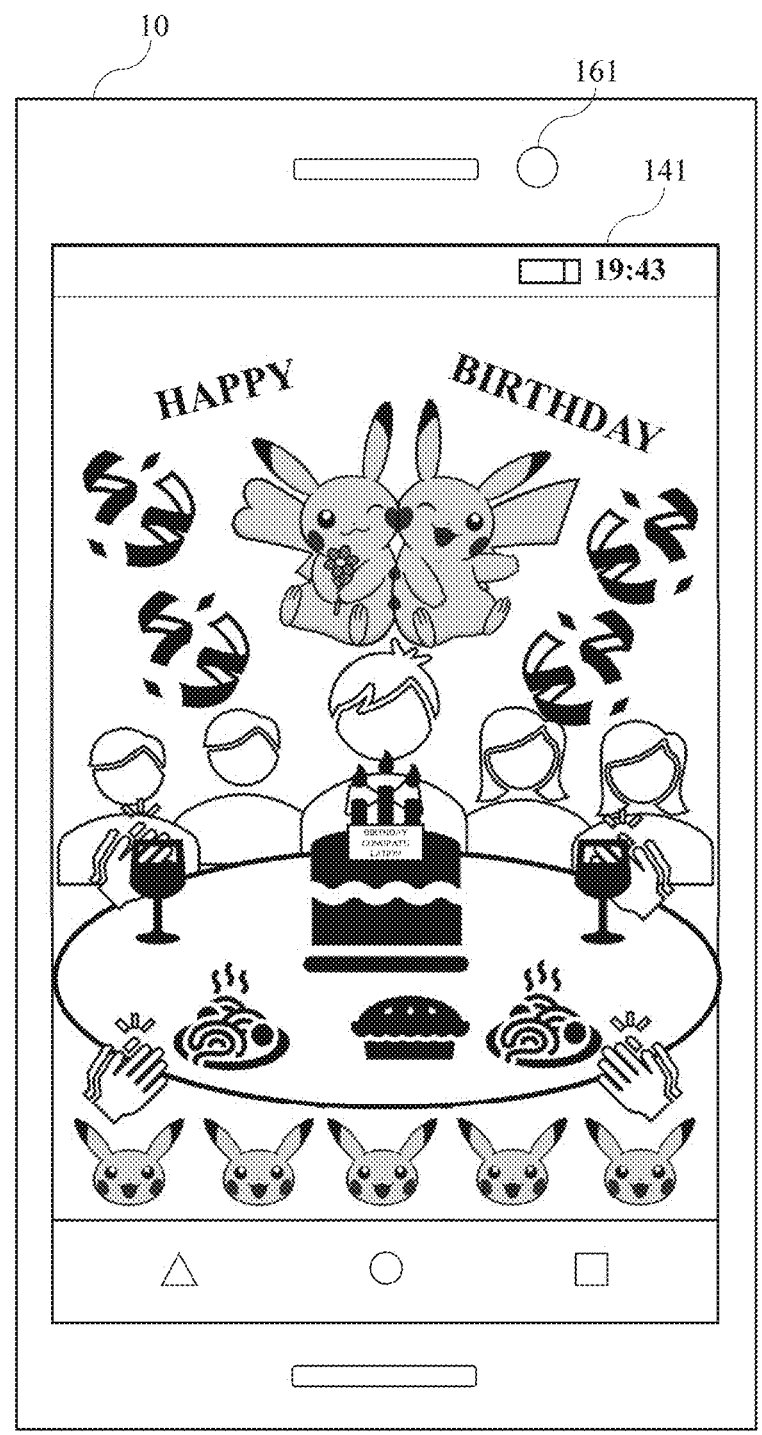
FIG. 10 is a diagram illustrating another example of the combination image displayed on the display.

FIG. 10 is a diagram illustrating another example of the combination image displayed on the display 141. The combination image illustrated in FIG. 10 is, for example, an image created in response to a combination image request instruction input after a predetermined time has elapsed since the combination image illustrated in FIG. 9 has been presented. The combination image illustrated in FIG. 10 has more gorgeous content than the combination image illustrated in FIG. 9.

Figure 11:
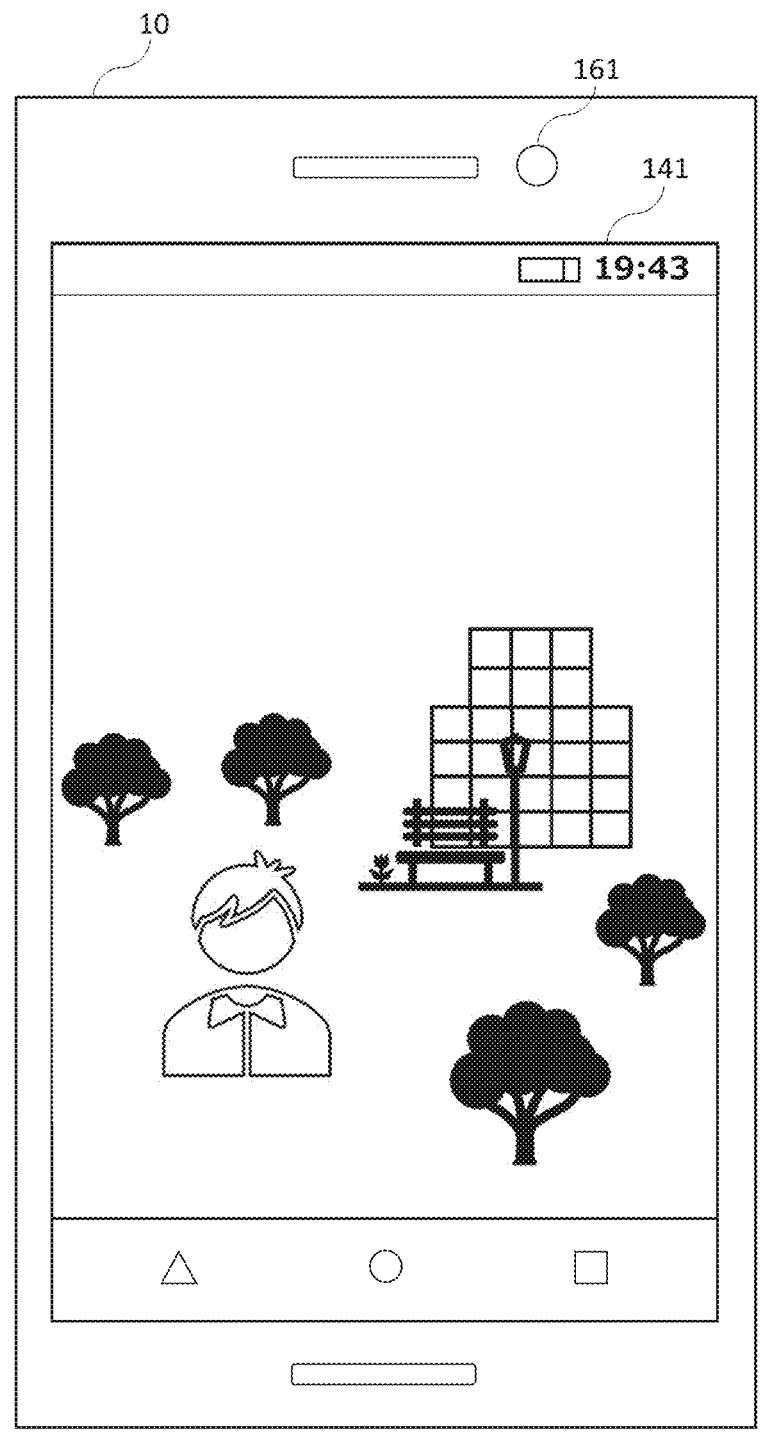
FIG. 11 is a diagram illustrating another example of the image determined as the first image.

FIG. 11 is a diagram illustrating another example of the image determined as the first image. The image illustrated in FIG. 11 has been captured at the park. The image illustrated in FIG. 11 includes, for example, a child playing at the park, and a ride and a bench at the park. Further, meta information including the items described in the image information DB 281, for example, is added to the image illustrated in FIG. 11.

The analysis module 2045 acquires context from the image illustrated in FIG. 11. For example, the analysis module 2045 acquires a context with content "an image in which AAAA plays at the park with longitude: Lat2 and latitude: Lon2 at 20YY/MM/DD" on the basis of the pixel information included in the image information and the information stored in the image information DB 281.

The acquisition module 2046 selects the parameter item on the basis of the context of "the image in which AAAA plays at the park with (longitude: Lat2 and latitude: Lon2) at 20YY/MM/DD" acquired by the analysis module 2045. The acquisition module 2046 selects, for example, any one of "the number of times photographing has been performed at the park with (longitude: Lat2 and latitude: Lon2)", "the number of visits to the park with (longitude: Lat2 and latitude: Lon2)", "the number of steps at the park", "movement distance at the park", "the number of days that have elapsed since a photographing date", "the number of days that have elapsed since a registration date", and "the total number of times photographing has been performed" as the parameter item. In the present description, for example, it is assumed that the acquisition module 2046 selects "the number of visits to the park with (longitude: Lat2 and latitude: Lon2)" as the parameter item. The acquisition module 2046 refers to the parameter DB 282 to acquire "the number of visits to the park with (longitude: Lat2 and latitude: Lon2)".

The determination module 2047 determines the object, for example, on the basis of the context of "the image in which AAAA plays at the park with (longitude: Lat2 and latitude: Lon2) at 20YY/MM/DD" acquired by the analysis module 2045. The determination module 2047, for example, selects an object whose item "relevant context" is a park. The determination module 2047 determines the level of the object according to, for example, a value of "the number of visits to the park with (longitude: Lat2 and latitude: Lon2)" determined by the acquisition module 2046. Here, it is assumed that the number of visits is insufficient to reach a level at which the object is combined. The determination module 2047 determines an object for prompting an additional visit.

The presentation module 2048 creates the second image on the basis of the object determined by the determination module 2047 and the display aspect of the object. The presentation module 2048 combines the created second image with the first image to create the combination image.

Figure 12:
FIG. 12 is a diagram illustrating another example of the combination image displayed on the display.

FIG. 12 is a diagram illustrating another example of the combination image displayed on the display 141. In the combination image illustrated in FIG. 12, a text is combined to request one more visit. In FIG. 12, since the parameter item is "the number of visits", "visiting the park one more time will make a fun image" is displayed as the text requesting one more visit. When the acquisition module 2046 selects another the parameter item, a different description will be displayed. For example, when "the number of times photographing has been performed at the park" is selected as the parameter item, the determination module 2047 determines "taking one more photograph at the park will make a fun image" as a text object for prompting additional photographing at the park.

Further, for example, when "the number of steps at the park" is selected as the parameter item, the determination module 2047 determines "a little more walking will make a fun image" as a text object for prompting further walking. Further, for example, when the "movement distance at the park" is selected as the parameter item, the determination module 2047 determines "exploring the park a little longer will make a fun image" as a text object for prompting further movement.

Further, for example, when "the number of days that have elapsed since a photographing date" or "the number of days that have elapsed since a registration date" is selected as the parameter item, the determination module 2047 determines "It will be a fun image tomorrow" as a text object for prompting the passage of days. Further, for example, when "the total number of times photographing has been performed" is selected as the parameter item, the determination module 2047 determines "taking one more photograph will make a fun image" as the text object for prompting additional photographing.

The number of times a display is performed when prompting the next action is not limited to one. The display may be performed from a plurality of times set in advance. The number decreases each time the corresponding action is performed, and the user can enjoy the countdown.

It is assumed that the user performs an action to be prompted after confirming the combination image illustrated in FIG. 12. Specifically, it is assumed that the user has had one or more opportunities to visit the park after the user confirms the combination image illustrated in FIG. 12. Accordingly, the value of "the number of visits to the park with (longitude: Lat2 and latitude: Lon2)" selected as the parameter item increases. After performing the requested activity, the user requests the combination image again. The determination module 2047 determines the level of the object according to the increased value of "the number of visits to the park with (longitude: Lat2 and latitude: Lon2)". The presentation module 2048 creates the combination image in which the object becomes gorgeous.

Figure 13:
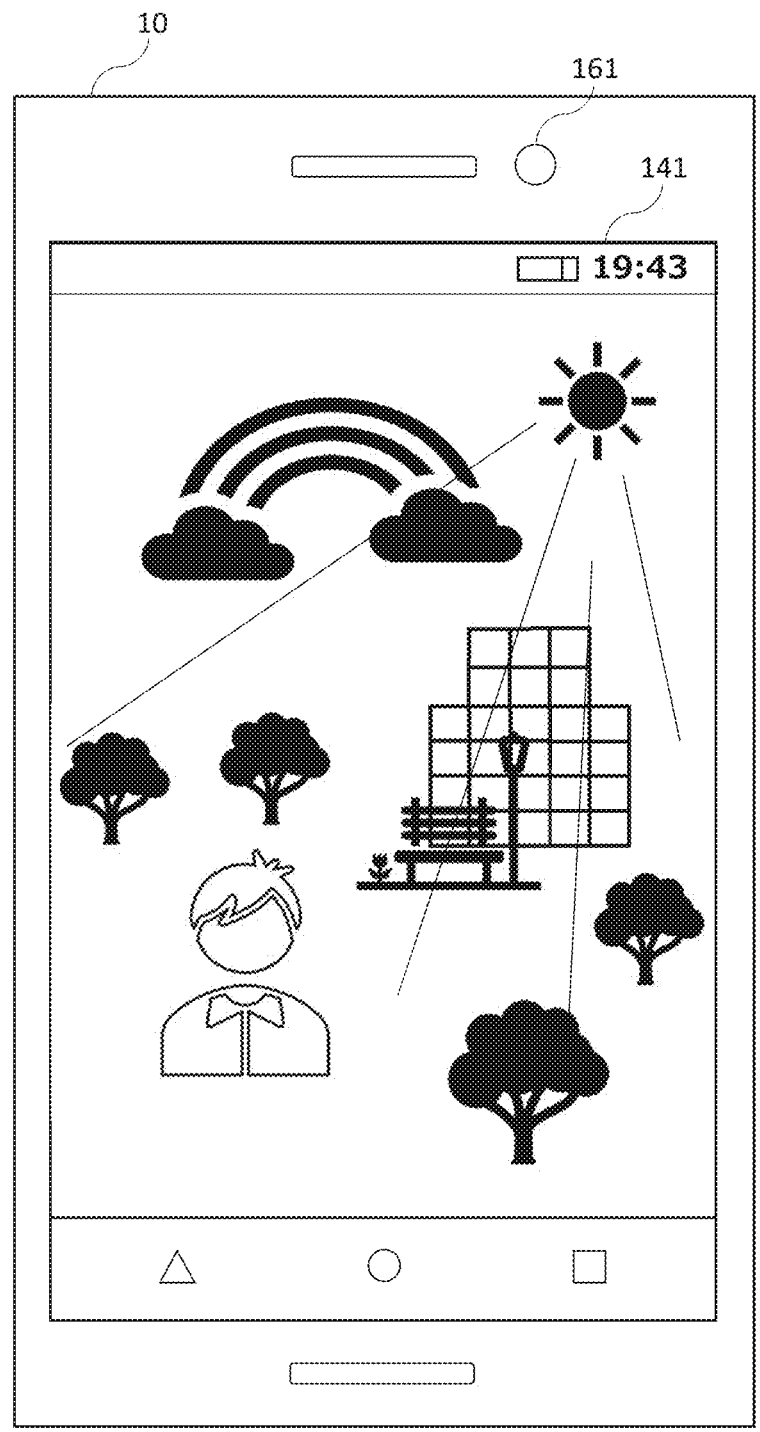
FIG. 13 is a diagram illustrating another example of the combination image displayed on the display.

FIG. 13 is a diagram illustrating another example of the combination image displayed on the display 141. The combination image illustrated in FIG. 13 is, for example, an image created in response to a request instruction after the user has performed the requested activity after the combination image illustrated in FIG. 12 has been presented. In the combination image illustrated in FIG. 13, the combination image based on the first image illustrated in FIG. 11 is displayed. In the combination image illustrated in FIG. 13, objects of a rainbow, the sun, and light are combined with the image at the park.

Figure 14:
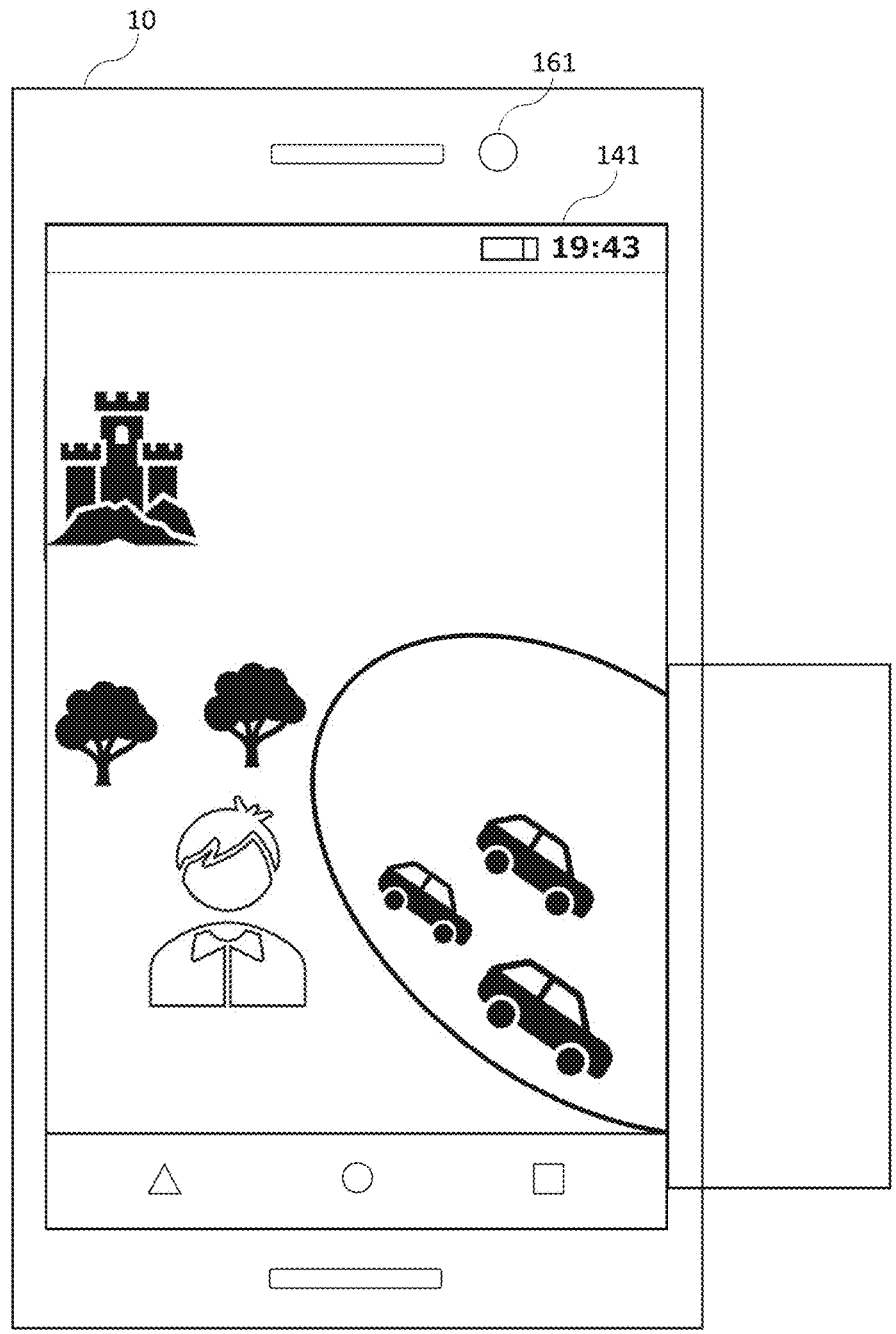
FIG. 14 is a diagram illustrating another example of the image determined as the first image.

FIG. 14 is a diagram illustrating another example of the image determined as the first image. The image illustrated in FIG. 14 has been captured at an amusement park. The image illustrated in FIG. 14 includes, for example, a child playing at the amusement park, a building at the amusement park, and attractions at the amusement park. Further, meta information including the items described in the image information DB 281, for example, is added to the image illustrated in FIG. 14.

The analysis module 2045 acquires a context from the image illustrated in FIG. 14. For example, the analysis module 2045 acquires a context with content "an image in which AAAA plays in an attraction A1 at an amusement park with (longitude: Lat3 and latitude: Lon3) in 19YY/MM/DD", on the basis of the pixel information included in the image information and the information stored in the image information DB 281.

The acquisition module 2046 selects the parameter item on the basis of the context of "the image in which AAAA plays in the attraction A1 at an amusement park with (longitude: Lat3 and latitude: Lon3) in 19YY/MM/DD" acquired by the analysis module 2045. The acquisition module 2046 acquires, for example, any one of "the number of times photographing has been performed at the amusement park with (longitude: Lat3 and latitude: Lon3)", "the number of visits to the amusement park with (longitude: Lat3 and latitude: Lon3)", "the number of steps at the amusement park", "a movement distance at the amusement park", "the number of days that have elapsed since a photographing date", "the number of days that have elapsed since a registration date", and "the total number of times photographing has been performed" as the parameter item. In the preset description, for example, it is assumed that the acquisition module 2046 selects "the number of days that have elapsed since a photographing date" as the parameter item. The acquisition module 2046 refers to the parameter DB 282 to acquire "the number of days that have elapsed since a photographing date".

The determination module 2047, for example, determines the object on the basis of the context of "the image in which AAAA plays in the attraction A1 at an amusement park with (longitude: Lat3 and latitude: Lon3) in 19YY/MM/DD" acquired by the analysis module 2045. The determination module 2047, for example, selects an object whose item "relevant context" is an amusement park. The determination module 2047 determines the level of the object according to, for example, a value of "the number of days that have elapsed since a photographing date" determined by the acquisition module 2046. In some amusement parks, an attraction installed in the past may be replaced with a new attraction. Therefore, when a predetermined number or more of days have elapsed since the photographing date, that is, when the value of the parameter item exceeds a predetermined value, an object introducing an existing attraction may be set. The determination module 2047 determines the object introducing an existing attraction for the first image with the number of elapsed days greater than or equal to a predetermined number. The determination module 2047 determines a size, angle, or the like of the object so that the determined object can be combined with the first image illustrated in FIG. 14.

The presentation module 2048 creates the second image on the basis of the object determined by the determination module 2047 and the display aspect of the object. The presentation module 2048 combines the created second image with the first image to create the combination image.

Figure 15:
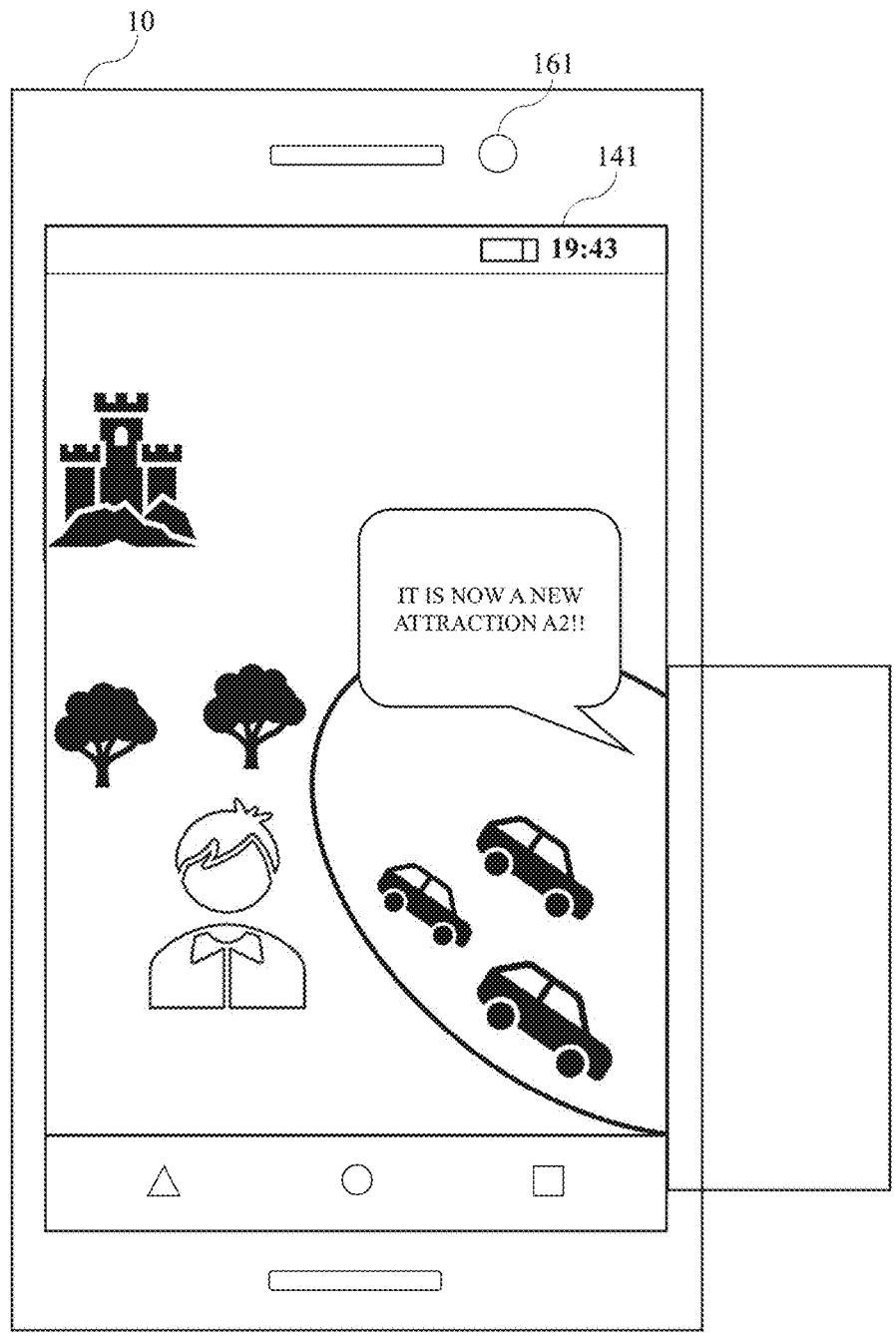
FIG. 15 is a diagram illustrating another example of the combination image displayed on the display.

FIG. 15 is a diagram illustrating another example of the combination image displayed on the display 141. In the combination image illustrated in FIG. 15, "It is now a new attraction A2!" is displayed near the attraction A1, as an object that introduces a new existing attraction A2. The user views a display for introducing a new attraction, such that the user can become interested in the new attraction and feel nostalgic for an attraction that is no longer available. Thus, the server 20 may combine useful information for the user as an object.

As described above, in the present embodiment, the server 20 registers the image designated by the user using the registration module 2043. The server 20 receives the request for the combination image from the user through the analysis module 2045. The server 20 analyzes the registered images in response to the request using the analysis module 2045 to acquire the context of the image. The server 20 acquires the parameter value related to the registered image among the parameter values updated according to the activity of the user, using the acquisition module 2046. The server 20 determines the object from the obtained context and the acquired parameter value using the determination module 2047. The server 20 combines the determined object with the registered image and presents a combination result to the user using the presentation module 2048. This makes it possible for the server 20 to combine an image not included at the time of photographing with an image photographed in the past in an aspect according to predetermined parameters from registration or photographing to the time of request. Therefore, the user can be provided with unexpected images based on the past images and enjoy the image.

Therefore, according to the server 20 of the present embodiment, it is possible to assign new interest to looking back on and reviewing past images.

Further, the server 20 receives the request for the combination image using the original image having the object combined therewith using the analysis module 2045. The server 20 acquires a parameter value updated according to the activity of the user after previous combination using the acquisition module 2046. Accordingly, when the server 20 receives a request for the combination image for the same image again after creating the combination image, it is possible to reflect, in the combination image, the parameter value updated from a time of a previous request to a time of a current request. Therefore, the server 20 can present, to the user, a combination image different from a previously presented combination image, such as a combination image in which an object more gorgeous than the previously presented combination image has been combined. Accordingly, the enjoyment of images captured in the past will increase.

Further, in the above embodiment, the acquisition module 2046 acquires parameter values from the parameter items such as a value related to the passage of time, the number of times of experience regarding a place, a value related to a movement, or the total number of times photographing has been performed. This makes it possible for the acquisition module 2046 to acquire a parameter value from any set parameter item.

Further, in the above embodiment, the acquisition module 2046 acquires the parameter value from the value of the parameter item set by the user or administrator. This makes it possible for the user to set the parameter items for making the combination image appear by himself/herself. That is, the user can perceive the presentation of the combination image as a reward for the goal (quota) set by the user. Therefore, the interest in presenting the combination image is improved.

Further, the administrator can freely set a condition related to the image. For example, the administrator can include a predetermined time in the parameter item for the place. Specifically, for example, the administrator can set the condition like "the number of visits to a predetermined place between XX o'clock and XX o'clock". When the administrator is allowed to set the parameter items in this way, a variation of a condition for making the combination image appear increases. Therefore, the user can perceive the presentation of the combination image as a reward for the goal (quota) set by the user. Therefore, the interest in presenting the combination image is improved. Further, a management side can provide the user with an opportunity to look back on past images.

Further, in the above embodiment, the analysis module 2045 acquires the context by ascertaining a place, a person, or an event included in the image through image analysis. This makes it possible for the server 20 to automatically extract the context from content included in the pixel information.

Further, in the above embodiment, the analysis module 2045 acquires the context by ascertaining a place, direction, or date and time in which the image has been captured, from meta information regarding the image. This makes it possible for the server 20 to automatically extract the context from the meta information.

Further, in the above embodiment, the determination module 2047 determines the object from a character, person, object, or text corresponding to the acquired context. This makes it possible for the server 20 to automatically determine the extracted context and the corresponding object.

Further, in the above embodiment, the determination module 2047 determines content of the object on the basis of a magnitude of the parameter value updated according to, for example, the activity of the user. This makes it possible for the server 20 to change the content of the object to be combined with the image according to the magnitude of the parameter value. Therefore, the user can enjoy seeing how his or her own activity has changed the image.

In the above embodiment, the acquisition module 2046 sets an image satisfying predetermined requirements among the registered images as the analysis target. This makes it possible for the server 20 to select the image that is the combination image source when a plurality of images are registered.

4 Modification Examples

The server 20 may add information associated with the first image, which is an original image, to the created combination image. For example, the server 20 writes information related to first information to the meta information of the combination image.

Upon the terminal apparatus 10 receiving the combination image from the server 20, the terminal apparatus 10 displays the received combination image on the display 141. The terminal apparatus 10 refers to the meta information attached to the combination image to detect an image related to the combination image from the image information 182. Specifically, for example, the terminal apparatus 10 detects an image that is captured under the same conditions as the first image associated with the combination image. The image captured under the same conditions is, for example, the following.

Image of which the photographing time is within a predetermined range (regardless of whether the image is a still image or a moving image. The same applies below.)

Image of which the photographing place is within a predetermined range

Image of which the photographing direction is within a predetermined range

Image associated with a photographing target

The terminal apparatus 10 displays the detected image on the display 141 so that the image can be distinguishable from other images. Specifically, for example, when the terminal apparatus 10 displays the combination image on the display 141, the terminal apparatus 10 proposes a display of an image related to the combination image to the user. When the user accepts the proposal, the terminal apparatus 10 displays, on the display 141, an image related to the combination image, such as a thumbnail image of an image captured under the same conditions as the first image associated with the combination image. The user selects an image from the thumbnail image displayed on the display 141 and visually recognizes the image. Thus, the image related to the image having the object combined therewith is presented to the user with the image distinguished from other images, making it possible for the server 20 to easily select an image related to a reminded image with the combination image as a trigger. Therefore, the user can look back on his/her own memory with the combination image as a trigger.

Further, the server 20 may share the generated image signal with other users. For example, when the server 20 transmits the combination signal to the terminal apparatus 10, the server 20 proposes sharing of the transmitted combination signal to the user.

When the user likes the combination image and agrees to share the combination image with others, the user accepts the proposal from the server 20.

When the user agrees to share the combination image, the server 20 distributes information for enabling access to the combination image to other users using a predetermined social network service (SNS) service, a mail service, a bulletin board, or the like. The server 20 may impose restrictions on a period of time in which the combination image can be accessed. The server 20 provides a predetermined reward to users who accept the sharing. The predetermined reward is, for example, as follows.

Addition and combination of an object to and with the combination image

Provision of advantageous effects (points, coupons, or the like)

Addition of the value of the predetermined the parameter item

Thus, the image with the object combined therewith is shared with other users, making it possible for the server 20 to present the enjoyment of creating a combination image to other users. Accordingly, the server 20 can make a user who has not created a combination image until now interested in the combination image. Further, the user with which the combination image has been shared can share his or her enjoyment with other users by distributing the enjoyment.

Further, the server 20 may display conditions (the parameter items and the values of the parameter items) for generating the combination image at a site in which the combination image is displayed. This makes it possible for the user with whom the combination image is shared to ascertain conditions for acquiring the combination image.

5 Other Embodiments

In the above embodiment, a case in which the acquisition module 2046 selects one parameter item and acquires a value of the selected parameter item has been described. However, the parameter item selected by the acquisition module 2046 is not limited to one. The acquisition module 2046 may select two or more parameter terms. The acquisition module 2046 may output a plurality of values of the selected parameter items to the determination module 2047. The acquisition module 2046 may output any one of the plurality of values of the selected parameter items to the determination module 2047. The acquisition module 2046 may calculate an evaluation value from the plurality of values of the selected parameter items.

The determination module 2047 determines the level of the object on the basis of the values output from the acquisition module 2046. When the plurality of values are output from the acquisition module 2046, the determination module 2047 may use any one of the plurality of values to determine the level of the object. The determination module 2047 may also determine the level of the object using the evaluation value calculated on the basis of the plurality of values.

Further, in the embodiment, the information for introducing a new attraction has been described as an example of the useful information to be presented to the user.

However, the useful information is not limited to information for introducing the new attraction. The determination module 2047 may also include the following as useful information:

Information on discount

Information on applicable right

Information for notifying of winning

When such information is likely to be combined, the server 20 displays a condition for generating useful information on the combination image so that the user can ascertain the condition when registering the image.

Further, in the embodiment, a case in which the image is an image captured by the user has been described as an example. However, the image is not limited thereto. The image may be, for example, a screenshot in a predetermined application or an image captured within the predetermined application. When the image is the screenshot in the predetermined application or the image captured within the predetermined application, the information based on the activity of the user may include, for example, an operation log of the user. The operation log of the user may include, for example, information based on an activity of the character operated by the user.

Further, in the embodiment, a case in which the parameter item managed by the parameter DB 282 is a parameter indicating the activity of the user or the like has been described as an example. The parameter DB 282 may manage parameters indicating, for example, the activity of the other user associated with the user. The acquisition module 2046 may also select the parameter items from items of the parameters indicating, for example, the activity of the other user associated with the user, for the first image. The determination module 2047 determines the level of the object on the basis of the value of the selected parameter item. Thus, the level of the object is changed on the basis of the value of the parameter item indicating, for example, the activity of the other user, and a photograph of the user is affected by activities of the others. Further, the photographs of the others are affected by one's own activities. Interest in creating the combination image or changing the combination image is improved.

Further, in the embodiment, a case in which the determination module 2047 determines the object on the basis of the context acquired by the analysis module 2045 has been described as an example. However, the determination module 2047 may not determine the object on the basis of the context. The determination module 2047 may, for example, determine the object by the following:

Designation by the user random

The object has already been determined

Although several embodiments of the present disclosure have been described above, these embodiments can be implemented in various other forms, and various omissions, replacements, and changes can be performed without departing from the spirit of the disclosure. These embodiments or modifications thereof are intended to be included in the scope or gist of the disclosure.

APPENDIX

Matters described in each of the embodiments will be added below.

Appendix 1

A program to be executed by a computer including a processor 29 and a memory 25, the program causing the processor to execute: registering a designated image (step S21);

receiving a request for a combination image (step S13);

acquiring a context of a registered image by analyzing the image in response to the request (step S23);

acquiring parameter values related to the registered image among parameter values updated according to an activity of a user (step S24);

determining an object from the acquired context and the acquired parameter values (step S25); and combining the determined object with the registered image and presenting a combination image to the user (step S26).

Appendix 2

The program according to (Appendix 1), wherein the acquiring of the parameter value includes acquiring the parameter value from a value related to the passage of time, the number of times of experience regarding a place, a value related to a movement, or a total number of times photographing has been performed.

Appendix 3

The program according to (Appendix 1) or (Appendix 2), wherein the acquiring of the parameter value includes acquiring the parameter value from a value of an item set by a user or the administrator.

Appendix 4

The program according to any one of (Appendix 1) to (Appendix 3), wherein the acquiring of the context includes acquiring the context by ascertaining a place, a person, or an event included in the image through image analysis.

Appendix 5

The program according to any one of (Appendix 1) to (Appendix 4), wherein the acquiring of the context includes acquiring the context by ascertaining a place, direction, or date and time in which the image has been captured, from meta information regarding the image.

Appendix 6

The program according to any one of (Appendix 1) to (Appendix 5), wherein the determining of the object includes determining the object from a character, person, object, or text corresponding to the acquired context.

Appendix 7

The program according to any one of (Appendix 1) to (Appendix 6), wherein the determining of the object includes determining content of the object on the basis of a magnitude of the acquired parameter value.

Appendix 8

The program according to any one of (Appendix 1) to (Appendix 7), wherein in the determining of the object, the object includes information useful to a user.

Appendix 9

The program according to any one of (Appendix 1) to (Appendix 8), wherein the acquiring of the context includes setting an image satisfying predetermined requirements among the registered images as the analysis target.

Appendix 10

The program according to any one of (Appendix 1) to (Appendix 9), wherein the receiving of the request includes receiving the request for the combination image using an original image in which the object is combined, and the acquiring of the parameter value includes acquiring a parameter value updated according to an activity of a user after a previous combination.

Appendix 11

The program according to any one of (Appendix 1) to (Appendix 10, causing the processor to execute identifying an image related to the image having the object combined therewith as another image and presenting the image to the user.

Appendix 12

The program according to any one of (Appendix 1) to (Appendix 11), causing the processor to execute sharing the image having the object combined therewith with other users.

Appendix 13

A method executed by a computer including a processor and a memory, the processor executing: registering a designated image; receiving a request for a combination image; acquiring a context of the image by analyzing a registered image in response to the request; acquiring parameter values related to the registered image among parameter values updated according to an activity of a user; determining an object from the acquired context and the acquired parameter values; and combining the determined object with the registered image and presenting a combination image to the user.

Appendix 14

An information processing apparatus including a control unit and a storage unit, the control unit executing: registering a designated image; receiving a request for a combination image; acquiring a context of the image by analyzing a registered image in response to the request; acquiring parameter values related to the registered image among parameter values updated according to an activity of a user; determining an object from the acquired context and the acquired parameter values; and combining the determined object with the registered image and presenting a combination image to the user.

Appendix 15

A system including: a means for registering a designated image;
a means for receiving a request for a combination image; a means for acquiring a context of the image by analyzing a registered image in response to the request; a means for acquiring parameter values related to the registered image among parameter values updated according to an activity of a user; a means for determining an object from the acquired context and the acquired parameter values; and a means for combining the determined object with the registered image and presenting a combination image to the user.

Appendix 16

A program to be executed by a computer including a processor and a memory, the program causing the processor to execute: registering a designated image; associating one registered image with a parameter value; determining a first object on the basis of the parameter value; presenting a first combination image obtained by combining the determined first object with the one image to the user; updating the parameter value when a predetermined condition is satisfied; determining a second object on the basis of the updated parameter values; and presenting a second combination image obtained by combining the determined second object with the one image to the user.

Appendix 17

A method executed by a computer including a processor and a memory, the processor executing: registering a designated image; associating one registered image with a parameter value; determining a first object on the basis of the parameter value; presenting a first combination image obtained by combining the determined first object with the one image to the user; updating the parameter value when a predetermined condition is satisfied;
    determining a second object on the basis of the updated parameter values; and presenting a second combination image obtained by combining the determined second object with the one image to the user.

Appendix 18

An information processing apparatus including a control unit and a storage unit, the control unit executing: registering a designated image; associating one registered image with a parameter value; determining a first object on the basis of the parameter value; presenting a first combination image obtained by combining the determined first object with the one image to the user; updating the parameter value when a predetermined condition is satisfied; determining a second object on the basis of the updated parameter values; and presenting a second combination image obtained by combining the determined second object with the one image to the user.

Appendix 19

A system including: means for registering a designated image; a means for associating one registered image with a parameter value; a means for determining a first object on the basis of the parameter value; a means for presenting a first combination image obtained by combining the determined first object with the one image to the user; a means for updating the parameter value when a predetermined condition is satisfied; a means for determining a second object on the basis of the updated parameter values; and a means for presenting a second combination image obtained by combining the determined second object with the one image to the user.

The invention claimed is:

1. A non-transitory computer-readable storage medium storing computer-readable instructions thereon which, when executed by a computer, cause the computer to perform a method, the method comprising:
    registering a designated image;
    receiving a request for a combination image;
    acquiring a context of a registered image by analyzing the image in response to the request;
    acquiring parameter values related to the registered image among parameter values updated according to an activity of a user occurring independently of registration of the designated image;
    determining an object from the acquired context and the acquired parameter values, wherein content of the determined object changes in accordance with a magnitude of the acquired parameter values; and
    combining the determined object with the registered image and presenting a combination image to the user.

2. The non-transitory computer-readable storage medium according to claim 1, wherein the acquiring of the parameter value includes one or more of acquiring the parameter value from a value related to a passage of time, a number of times of experience regarding a place, a value related to a movement, and a total number of times photographing has been performed.

3. The non-transitory computer-readable storage medium according to claim 1, wherein the acquiring of the parameter value includes acquiring the parameter value from a value of an item set by a user or an administrator.

4. The non-transitory computer-readable storage medium according to claim 1, wherein the acquiring of the context includes acquiring the context by ascertaining a place, a person, or an event included in the image through image analysis.

5. The non-transitory computer-readable storage medium according to claim 1, wherein the acquiring of the context includes acquiring the context by ascertaining a place, direction, or date and time in which the image has been captured, from meta information regarding the image.

6. The non-transitory computer-readable storage medium according to claim 1, wherein the determining of the object includes determining the object from a character, person, object, or text corresponding to the acquired context.

7. The non-transitory computer-readable storage medium according to claim 1, wherein the determining of the object includes determining content of the object based on a magnitude of the acquired parameter value.

8. The non-transitory computer-readable storage medium according to claim 1, wherein in the determining of the object, the object includes information related to an environment of a user.

9. The non-transitory computer-readable storage medium according to claim 1, wherein the acquiring of the context includes setting an image satisfying predetermined requirements among the registered images as an analysis target.

10. The non-transitory computer-readable storage medium according to claim 1,
    wherein the receiving of the request includes receiving the request for the combination image using an original image in which the object is combined, and
    the acquiring of the parameter value includes acquiring a parameter value updated according to an activity of a user after a previous combination.

11. The non-transitory computer-readable storage medium according to claim 1, further comprising identifying an image related to the image having the object combined therewith as another image and presenting the image to the user.

12. The non-transitory computer-readable storage medium according to claim 1, further comprising sharing the image having the object combined therewith with other users.

13. A method, comprising:
    registering a designated image;
    receiving a request for a combination image;
    acquiring a context of the image by analyzing a registered image in response to the request;
    acquiring parameter values related to the registered image among parameter values updated according to an activity of a user occurring independently of registration of the designated image;
    determining an object from the acquired context and the acquired parameter values, wherein content of the determined object changes in accordance with a magnitude of the acquired parameter values; and combining the determined object with the registered image and presenting a combination image to the user.

14. An information processing apparatus, comprising:
processing circuitry configured to register a designated image;
receive a request for a combination image;
acquire a context of the image by analyzing a registered image in response to the request;
acquire parameter values related to the registered image among parameter values updated according to an activity of a user occurring independently of registration of the designated image;
determine an object from the acquired context and the acquired parameter values, wherein content of the determined object changes in accordance with a magnitude of the acquired parameter values; and
combine the determined object with the registered image and present a combination image to the user.

15. A system, comprising:
a means for registering a designated image;
a means for receiving a request for a combination image;
a means for acquiring a context of the image by analyzing a registered image in response to the request;
a means for acquiring parameter values related to the registered image among parameter values updated according to an activity of a user occurring independently of registration of the designated image;
a means for determining an object from the acquired context and the acquired parameter values, wherein content of the determined object changes in accordance with a magnitude of the acquired parameter values; and
a means for combining the determined object with the registered image and presenting a combination image to the user.

16. A non-transitory computer-readable storage medium storing computer-readable instructions thereon which, when executed by a computer, cause the computer to perform a method, the method comprising:
registering a designated image;
associating one registered image with a parameter value;
determining a first object on the basis of the parameter value, wherein content of the first object is determined in accordance with a magnitude of the parameter value;
presenting a first combination image obtained by combining the determined first object with the one image to the user;
updating the parameter value when a predetermined condition is satisfied, wherein the predetermined condition relates to an activity of a user occurring independently of registration of the designated image;
determining a second object on the basis of the updated parameter values, wherein content of the second object changes from the content of the first object in accordance with a magnitude of the updated parameter values; and
presenting a second combination image obtained by combining the determined second object with the one image to the user.

17. A method, comprising:
registering a designated image;
associating one registered image with a parameter value;
determining a first object based on the parameter value;
presenting a first combination image obtained by combining the determined first object with the one image to the user;
updating the parameter value in response to a predetermined condition being satisfied, wherein the predetermined condition relates to an activity of a user occurring independently of registration of the designated image;
determining a second object based on the updated parameter values, wherein content of the second object changes from the content of the first object in accordance with a magnitude of the updated parameter values; and
presenting a second combination image obtained by combining the determined second object with the one image to the user.

18. An information processing apparatus, comprising:
processing circuitry configured to
register a designated image;
associate one registered image with a parameter value;
determine a first object based on the parameter value;
present a first combination image obtained by combining the determined first object with the one image to the user;
update the parameter value in response to a predetermined condition being satisfied, wherein the predetermined condition relates to an activity of a user occurring independently of registration of the designated image;
determine a second object based on the updated parameter values, wherein content of the second object changes from the content of the first object in accordance with a magnitude of the updated parameter values; and
present a second combination image obtained by combining the determined second object with the one image to the user.

19. A system, comprising:
an information processing apparatus, and
processing circuitry configured to
register a designated image;
associate one registered image with a parameter value;
determine a first object based on the parameter value;
present a first combination image obtained by combining the determined first object with the one image to the user;
update the parameter value in response to a predetermined condition being satisfied, wherein the predetermined condition relates to an activity of a user occurring independently of registration of the designated image;
determine a second object based on the updated parameter values, wherein content of the second object changes from the content of the first object in accordance with a magnitude of the updated parameter values; and
present a second combination image obtained by combining the determined second object with the one image to the user.

* * * * *